(12) United States Patent
Sappington

(10) Patent No.: US 7,873,568 B1
(45) Date of Patent: Jan. 18, 2011

(54) LOAN MANAGEMENT ACCOUNT

(75) Inventor: Bill E. Sappington, Titusville, NJ (US)

(73) Assignee: Bank of America Corporation, Charlotte, NC (US)

( * ) Notice: Subject to any disclaimer, the term of this patent is extended or adjusted under 35 U.S.C. 154(b) by 1170 days.

(21) Appl. No.: 11/001,577

(22) Filed: Nov. 30, 2004

(51) Int. Cl.
*G06Q 40/00* (2006.01)

(52) U.S. Cl. .......................................... 705/38

(58) Field of Classification Search ............ 705/38–39, 705/35, 36 R; 725/376; 707/607
See application file for complete search history.

(56) References Cited

U.S. PATENT DOCUMENTS

| | | | | |
|---|---|---|---|---|
| 5,025,138 | A * | 6/1991 | Cuervo | 705/38 |
| 5,644,727 | A * | 7/1997 | Atkins | 705/40 |
| 5,870,721 | A * | 2/1999 | Norris | 705/38 |
| 5,911,136 | A * | 6/1999 | Atkins | 705/36 R |
| 7,089,202 | B1 * | 8/2006 | McNamar et al. | 705/35 |
| 2003/0036993 | A1 * | 2/2003 | Parthasarathy | 705/38 |
| 2003/0069838 | A1 * | 4/2003 | Harland | 705/38 |
| 2005/0065871 | A1 * | 3/2005 | Gerhart et al. | 705/38 |

OTHER PUBLICATIONS

Akhtar, "Causes and Consequences of the 1989-92 Credit Slowdown: Overview and Perspective", Federal Reserve Bank of New York Quarterly Review, v18n4, pp. 1-23, Winter 1993.*

* cited by examiner

*Primary Examiner* — Mary Cheung
(74) *Attorney, Agent, or Firm* — Michael Springs

(57) ABSTRACT

One or more brokerage collateral accounts held at a financial institution are provided. A bank loan account secured by at least one of the collateral accounts with the financial institution is established. The bank loan account interfaces with the collateral accounts within the financial institution. The bank loan account has a credit limit that is based on a market value of the secured collateral accounts. The collateral accounts include various types of assets. The loan account includes a revolving line of credit, any number of term loans, or letters of credit. The interest rate of the line of credit may be based on a selected index rate. Further, the loan account may be used as an overdraft account for the secured collateral account. Clients may access both their collateral accounts and their loan account through the brokerage infrastructure including an integrated portal with a network of computers or via telephone.

47 Claims, 32 Drawing Sheets

Loan Management Account

Analysis Summary

Please confirm the selection of account(s) to be pledged. If all selection(s) are correct, click 'Next Step' to continue. If one or more of the selections is not correct, click 'Previous Step'.

Eligible ML Collateral Account(s) Summary

| Name | SSN/EIN | Account | Trade Type | Total Value | Estimated Credit |
|------|---------|---------|------------|-------------|------------------|
|      | - -     |         | Cash       | $          | $                |

Estimated Credit Available: $

Loan Summary Analysis

Desired Loan Amount: $
Current Estimated Credit: $

[< Previous Step]  [Next Step >]

[Save & Exit]

View a printer-friendly version of this page.

LOAN MANAGEMENT ACCOUNT

FIELD OF THE INVENTION

The present invention relates to financial management systems. More particularly, the present invention relates to securities-based lending accounts.

BACKGROUND OF THE INVENTION

Financing solutions based on collateral such as equity in a home or assets in a portfolio provide an alternative to credit cards and personal loans. With margin, one can leverage and borrow against eligible securities in a portfolio. Typically, up to 50% of the market value of the eligible securities can be borrowed. The borrowed amount can be used for personal financing or investment financing such as to rebalance the portfolio and/or to diversify holdings, all without liquidating assets or incurring potential capital gains taxes. The margin loan and the securities assets are comingled in the same account. The interest rate on the margin loan is typically based on the outstanding balance of the loan.

However, some types of investment products and securities and accounts may not be used to pledge for a margin loan. Furthermore, margin carries advance rate limitations based on regulation requirements (Regulation T) and does not allow access to liquidity across multiple accounts. These restrictions make it difficult for the current margin product to meet consumer and business demand for non-purpose lending. Clients typically do not want to commingle their financial transactions, but instead prefer that non-purpose credit transactions be segregated from investment activities.

In order to borrow against securities for a non-purpose loan, a client needs to fill out an application, receive credit approval, sign loan documents, set up a separate pledge collateral account, then transfer assets into this account where they are generally not allowed to trade. Furthermore, from the financial institution part, collateral monitoring processes are performed within various business groups on different systems. Such securities based lending is further strictly regulated (Regulation U) and includes limitations resulting in a laborious manual process for a client to obtain a loan based on their securities held in a brokerage account. FIG. 1A illustrates a process for loan origination and servicing in accordance with a prior art. The manual processes must originate loans, approve loan draw-downs and payments, monitor collateral and send call notification at 110. The origination process starts at 112 where the financial advisor submits a request to the finance director. At 116, the finance director forwards the request to credit administration. At the 118, the finance director approves the request upon review of the credit. At 120, documentation is prepared, signed, and returned to another facility. The credit facility account is created at 122. The account includes securities processing 124, cash balances in collateral account 134, and deal inputting 126 and deal processing 136. The securities processing occurs at 128 where the collateral account is reconciled at 130 and monitored at 132. Separate processes are established at 138 with journal entry processing 140 and collateral monitoring 142. The above illustrates the manually intensive process in order to originate and approve a loan, monitor collateral and send call notification.

Accordingly, a need exists for a method and consolidated system for establishing and managing loans, lines of credit and pledge collateral in an integrated way. It would be desirable to have an integrated securities-based lending platform that leverages the broker-dealer infrastructure, that traditionally supports margin lending, to support Regulation U and Bank Regulated loans, while at the same time eliminating the cumbersome and labor intensive business processes currently inherent in most lending institutions. A primary purpose of the present invention is to solve these needs and provide further, related advantages.

BRIEF DESCRIPTION OF THE INVENTION

The loan management account is a securities-based bank loan account for non-purpose borrowing that delivers banking functionality through a brokerage infrastructure. The component processes include loan origination, access to funds and loan repayments, loan servicing and information display, collateral monitoring, data transport, and the ability to maintain multiple loans in one account. The loan origination process is integrated in the brokerage system so that it is conveniently accessible to the client at every brokerage branch of the financial institution. The access to funds and loan repayments component is also accessible at branch offices or through centralized client service phone numbers and integrated with the draws and payments systems of the financial institution. The collateral monitoring and line of credit availability are provided in real-time such that the loan and collateral accounts become "integrated" and "self-monitored". The Data Transport component allows the broker/dealer to send and receive in real-time data to and from the bank system of the financial institution. The bank system may also include a treasury risk management system. The multiple loan component allows multiple loans to be serviced for a single LMA account.

One or more collateral accounts held at a financial institution are provided. A loan account secured by at least one of the collateral accounts with the financial institution is established. The loan account (banking account) interfaces with the collateral account (brokerage account) within the financial institution using the LMA integrated platform. The loan account has a credit limit that is based on a market value of the secured collateral accounts. The collateral accounts include various types of assets. The loan account includes a revolving line of credit, any number of term loans, or letters of credit. The interest rate of the line of credit may be based on a selected index rate. Further, the loan account may be used as an overdraft account for the secured collateral account. Clients may access their collateral accounts and their loan account through an integrated portal with a network of computers or via telephone.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 8A, 8B, 8C, 8D, 8E, 8F, 8G is a screenshot of an interface for opening a loan account in accordance with one embodiment.

DETAILED DESCRIPTION

Figure 1A:
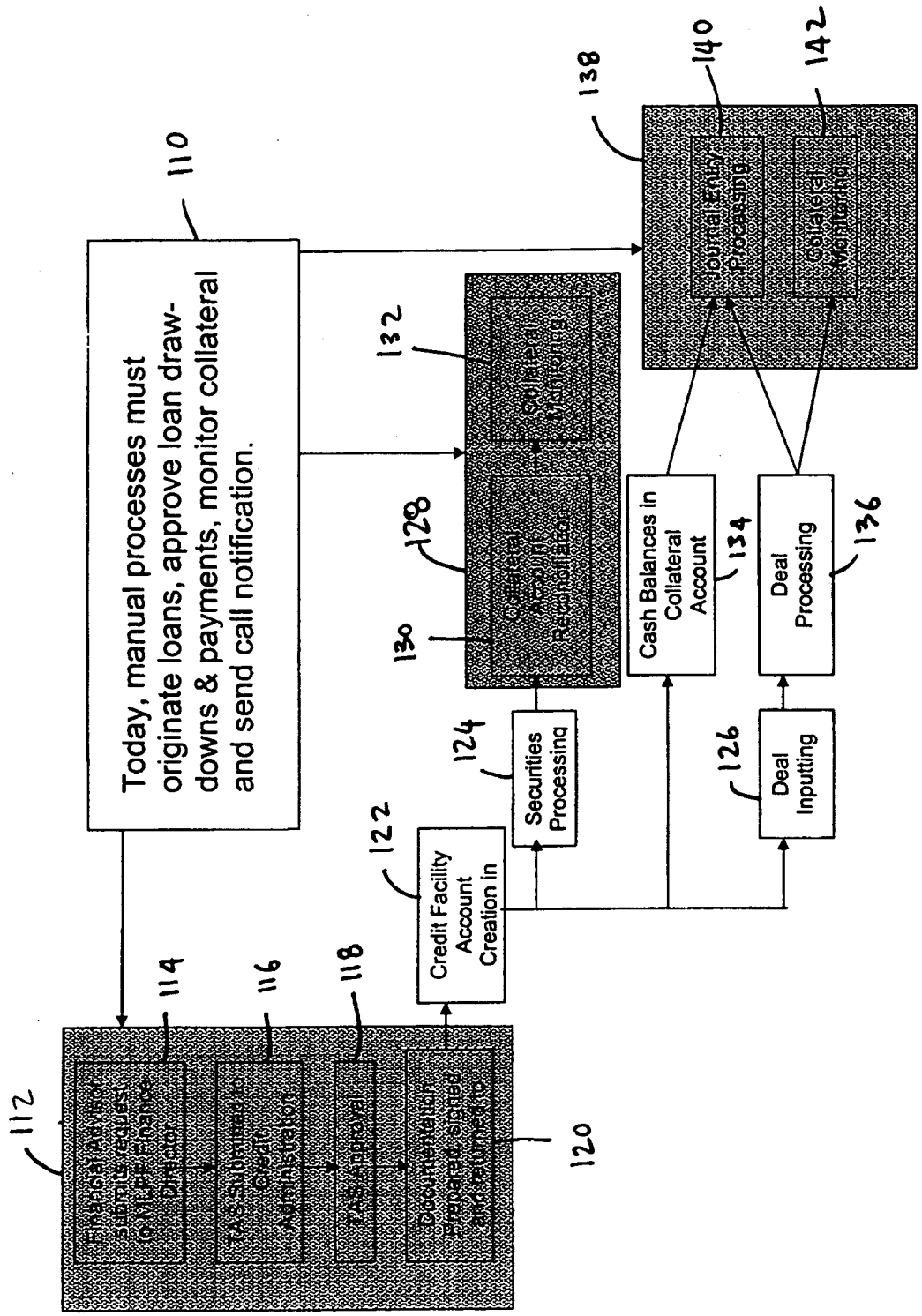
FIG. 1A is a flow diagram schematically illustrating a method for establishing and managing a non-purpose loan account in accordance with a prior art.

Embodiments of the present invention are described herein in the context of a loan management account. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

The Loan Management Account (LMA) can be used for personal or business needs such as home improvement, tax payments, education financing, medical expenses, business expansion or acquisition, debt consolidation, diversification. Clients may access their available credit by simply writing an LMA account convenience check. Other features such as ACH transfers, Funds Transfer Service (FTS), Fed wires, and journal entries to other accounts may be available.

The interest rates for LMA may be based on the London Interbank Offered Rate (LIBOR) plus a spread. Rates may be determined by a client's total available credit. For example, for revolving line of credit, the rate may be variable based on a 1-month LIBOR. For term loans (large amounts), the rate may be based on LIBOR contracts, ranging from 1 to 12 months. Longer-term loans may range from 2 to 5 years.

Unlike other types of securities-based loans, an LMA loan does not require collateral to be transferred to a special account. Clients can pledge one or more eligible accounts simply by designating them. Further, clients can continue to manage their investments and cash in these accounts, keeping their investment strategy on track. But the LMA has a required minimum collateral value that is the dollar amount clients need to maintain in pledged accounts to avoid a collateral call at the current level of borrowing.

Figure 1B:
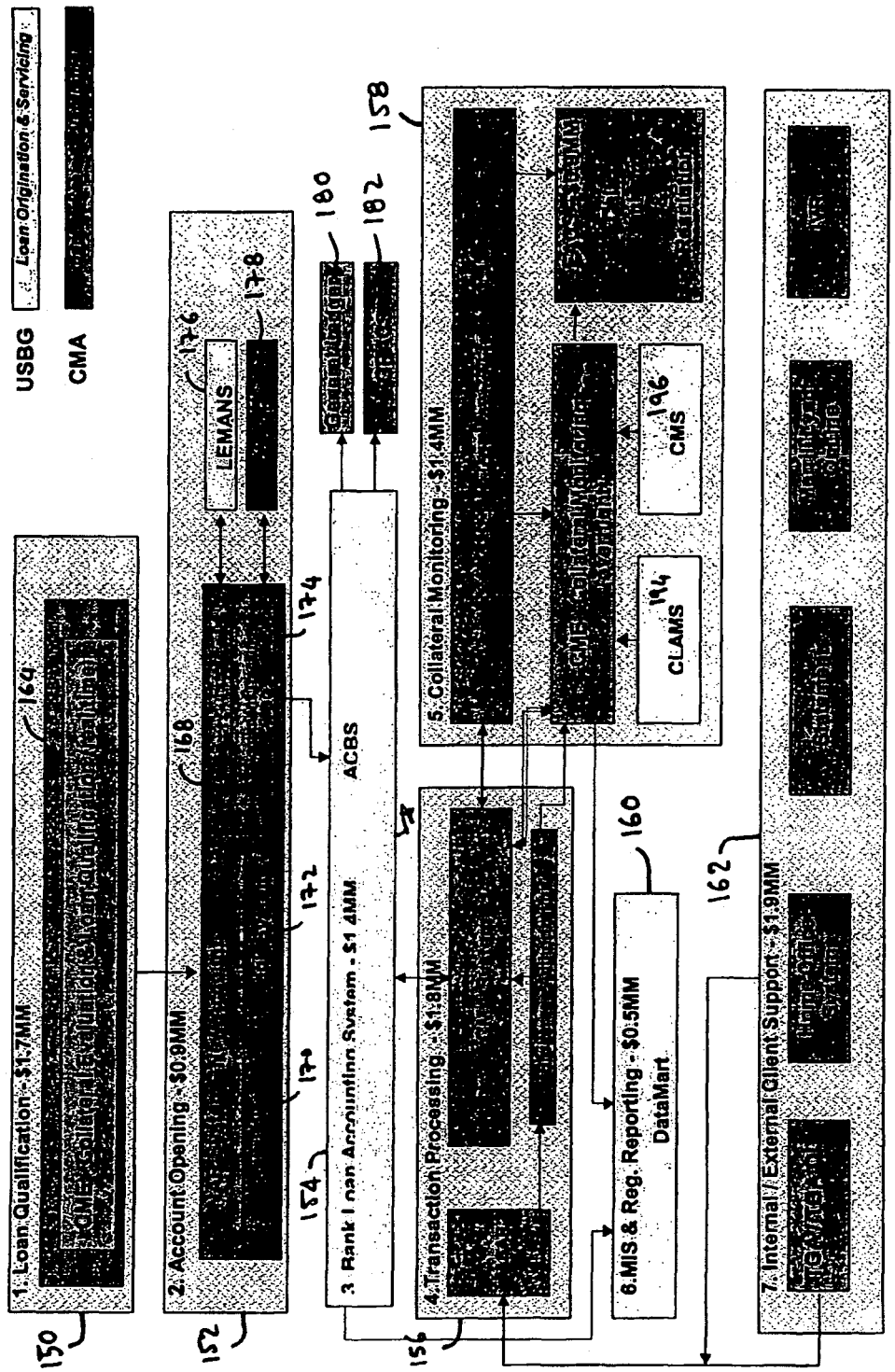
FIG. 1B is a flow diagram schematically illustrating a method for establishing, managing and monitoring a non-purpose securities-based loan account in accordance with one embodiment.

FIG. 1B illustrates a process flow of a Liquidity Management Account (LMA) (now known as Loan Management Account). The LMA is a consolidated, non-purpose loan origination system that delivers banking functionality through a brokerage infrastructure. The component processes include loan origination 150, account opening 152, bank loan accounting system 154, transaction processing 156, collateral monitoring 158, MIS and Regulation Reporting 160, and Internal/External client support 162.

The loan qualification 150 is the first step in the LMA new account process. Clients identify the assets to pledge to secure a loan. Proposed collateral is systematically evaluated in real-time at 166, and assigned an advance (and maintenance) percentage. As clients can pledge more than one collateral account to secure a loan, the advance rates across all eligible accounts are aggregated, and the result is the maximum credit available in the LMA account. A credit score is run on each applicant as well. Clients with complex forms of collateral securities (e.g. exchange funds, OP units, and collars), or that have a sub-standard credit score will be routed via a systematic ASAP request to the Home Office as an exception.

Clients that are qualified for an advance can open an LMA account at 152, leveraging the CMA account opening process used in the branch office in real-time. Documents are tracked using the Branch Office document tracking process at 174, with the executed loan agreement returned to Xerox Processing Center in Hot Springs, Ark. Once returned and approved by the bank, the LMA account is activated for loan drawdowns and the extension of credit. LMA Accounts are opened on the brokerage system just as central asset accounts and are managed using the CMA Asset Management (AM) and Accounts Processing (AP) Bookkeeping systems, also on the brokerage system.

At the Bank Loan Accounting System component at 154, with an eight-digit brokerage account number assigned, new loans are systematically booked into ACBS at 154, the bank loan accounting system used to service and support the LMA product. ACBS provides loan accounting & support services and has been fully integrated directly with AM and AP systems on the brokerage system. ACBS calculates accrued interest, maintains facility-to-loan relationships for traunches and carve-outs, supports client relationships for multiple borrower facilities, communicates all client loan activity for information distribution, supports loan participation as well as a variety of rate indexes and product types At the transaction processing component 156, LMA accounts will have check access to support the draw of funds, and will provide for the automatic transfer of funds from other eligible brokerage accounts to support automatic loan paydowns. Clients can choose to direct Overdrafts from eligible collateral accounts to their LMA account. When an LMA account is linked to certain business brokerage collateral account(s), deposits to, and withdrawals from, those accounts will pay down or draw down the LMA line of credit.

At the collateral monitoring component 158, in order to establish borrowing availability, clients designate one or more eligible brokerage account(s) to be used as collateral (e.g., CMA, TMA, Unlimited Advantage, EMA, WCMA and all managed accounts including Consults). Retirement and margin accounts are not eligible to be used as collateral accounts. Long market value of securities in these accounts is assigned an advance rate, and the advance rate values are aggregated. The result is the maximum amount of available credit in the LMA account. Clients can pledge third party accounts as well.

Once the LMA account is activated, supporting collateral is monitored daily at 192, with advance and maintenance rates compared to a client's outstanding loan balance Trading and other activity is permitted (with certain restrictions) in the collateral accounts. However, changes in securities being used as collateral may result in collateral calls or the decrease in total available credit. In general, collateral calls will be handled by the margin system on the brokerage platform consistent with current margin procedures.

At the Regulations Reporting component 160, as loans are booked and serviced, loan information extracted from ACBS and collateral information extracted from the new Collateral Monitoring System will be passed to the data warehouse for MIS and regulatory reporting purposes.

At the Internal/External Client Support 162, requests for service follow established maintenance and support channels on the brokerage platform, with direct client inquires serviced through Financial Relationship Services, and Branch Office Inquiries supported through the Merrill Lynch Service Network brokerage personnel. Appropriate brokerage systems and business processes will be modified for the new LMA product (e.g. the ASAP and Brokerage Authorization systems). Clients will be able to obtain LMA account information by viewing their account statement, and daily account activity will be available online and through the Voice Response System.

Since LMA is a completely separate bank loan account, clients will receive a separate monthly activity statement, but can be included as part of their consolidated statement link package (including all designated collateral accounts) for activated loan accounts. Clients will see credit line size, draws against the line, and changes to it via the monthly statement. The statement will re-cap credit use, credit availability and interest calculations, and include a graph indicating borrower's level of equity vs. the level that would prompt a maintenance call.

Figure 1C:
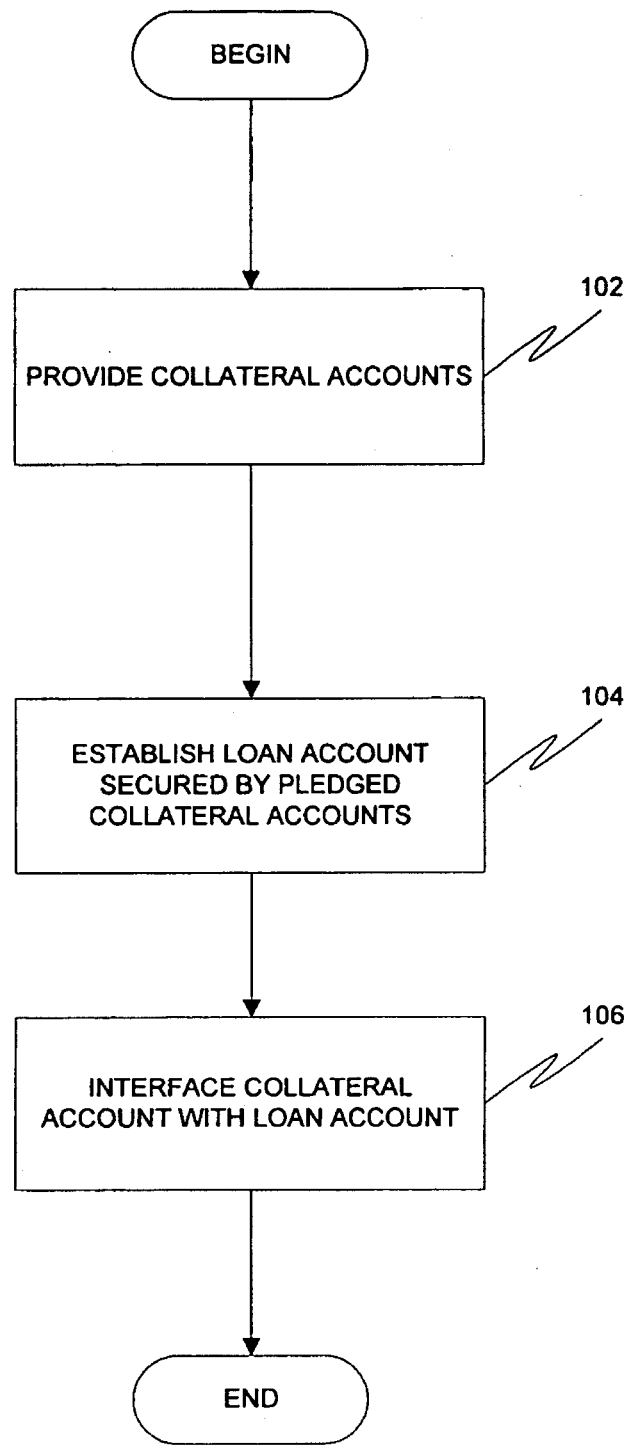
FIG. 1C is a flow diagram schematically illustrating a method for managing financial accounts in accordance with one embodiment.

FIG. 1C illustrates a method for managing financial accounts. At 102, at least one collateral account held at a financial institution is provided. At 104, a loan account secured by at least one of the collateral accounts with the financial institution is established. The loan account has a credit limit that is based on a market value of the secured collateral accounts.

The collateral accounts may include and are not limited to the following: equities, mutual funds, unit investment trusts, certificates of deposit, commercial paper, real estate investment trusts, corporate debt instruments, treasury debt instruments, municipal debt instruments, derivative investments, and foreign securities.

The loan account may include a revolving line of credit, a term loan, and a letter of credit. The interest rate of the line of credit may be based on a LIBOR rate. Further, the loan account may be used as an overdraft account for the secured collateral account.

The client may access the collateral accounts and the loan account through an integrated portal with a network of computers or via telephone as further discussed and illustrated below.

An analysis of the secured collateral account may be performed prior to establishing the loan account. A credit report and a credit score of the borrower may be ordered. The credit limit for the loan account may be based on the analysis of the secured collateral account and the credit report and credit score.

The analysis may include classifying the collateral accounts by product type, determining eligible account types from the classification, determining eligible collateral types from the eligible account types. The analysis may also include calculating the credit limit based on the eligible collateral types and a predetermined set of advance percentage, and requirements percentage.

The advance percentage is the amount that can be borrowed as a percentage of the security's long market value. For example, the advance percentage may be about 50% of the market value of securities held in the collateral account.

The requirement percentage is the minimum equity needed to support the loan as a percentage of the security's long market value. Should the equity value fall below this minimum, additional collateral may be required and/or the securities may be sold. For example, the requirement percentage may be about 30% of the market value of securities held in the collateral account.

The analysis may also incorporate calculating the credit limit based on a risk category of the eligible collateral types. For example, for a low risk category, the advance percentage may be 85% while the requirement percentage may be 10%. For a high risk category, the advance percentage may be 40% while the requirement percentage may be 40%.

Because of regulatory rules, the analysis may also include identifying whether the eligible collateral types are restricted by any regulations. This is further discussed below.

Once a loan account is established, the secured collateral account needs to be monitored to satisfy the above predetermined set of percentage advance and requirements. The monitoring may be accomplished by first obtaining daily market prices for each security and account types in the secured collateral account and by calculating the market value of the secured collateral account based on the market prices of the securities. The credit limit of the loan account is adjusted using the updated market value of the collateral account.

When the total amount borrowed from the loan account exceeds the credit limit, a collateral call is placed on the account. The client will then need to either fund the collateral account with additional securities and/or money, or pay down a portion or the loan balance.

Figure 2:
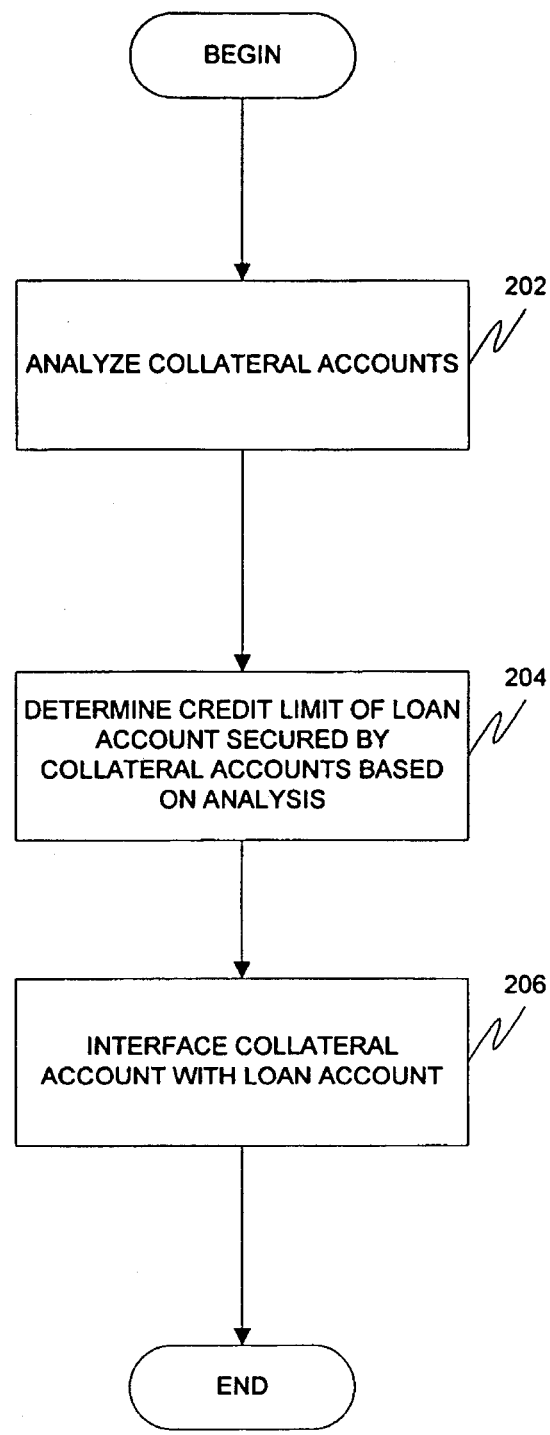
FIG. 2 is a flow diagram schematically illustrating a method for establishing a loan account at a financial institution in accordance with one embodiment.

FIG. 2 illustrates a method for establishing a loan account at a financial institution. At 202, one or more collateral accounts at the financial institution are analyzed. At 204, the credit limit of the loan account secured by the collateral accounts is determined based on the analysis of the collateral accounts. The analysis has been briefly described above and is discussed in more detail below.

Figure 3:
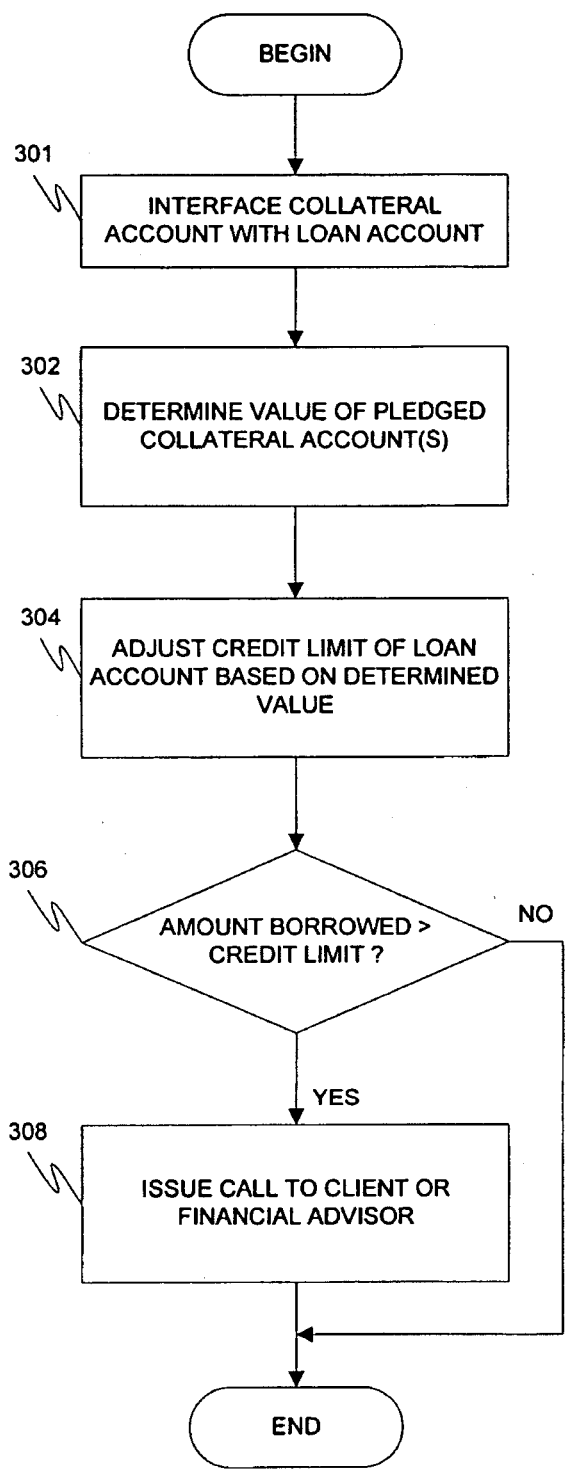
FIG. 3 is a flow diagram schematically illustrating a method for managing a loan account at a financial institution in accordance with one embodiment.

FIG. 3 illustrates a method for managing a loan account at a financial institution. At 302, the market value of a collateral account pledged against the loan account is determined. At 304, the credit limit of the loan account is adjusted based on the market value of the collateral account. The monitoring has been briefly described above and is discussed in more detail below. A determination of the amount borrowed versus the credit limit is performed at 306. At 308, a collateral call is issued to the client if the amount borrowed exceeds the adjusted credit limit based on the market value of the collateral account.

Figure 4:
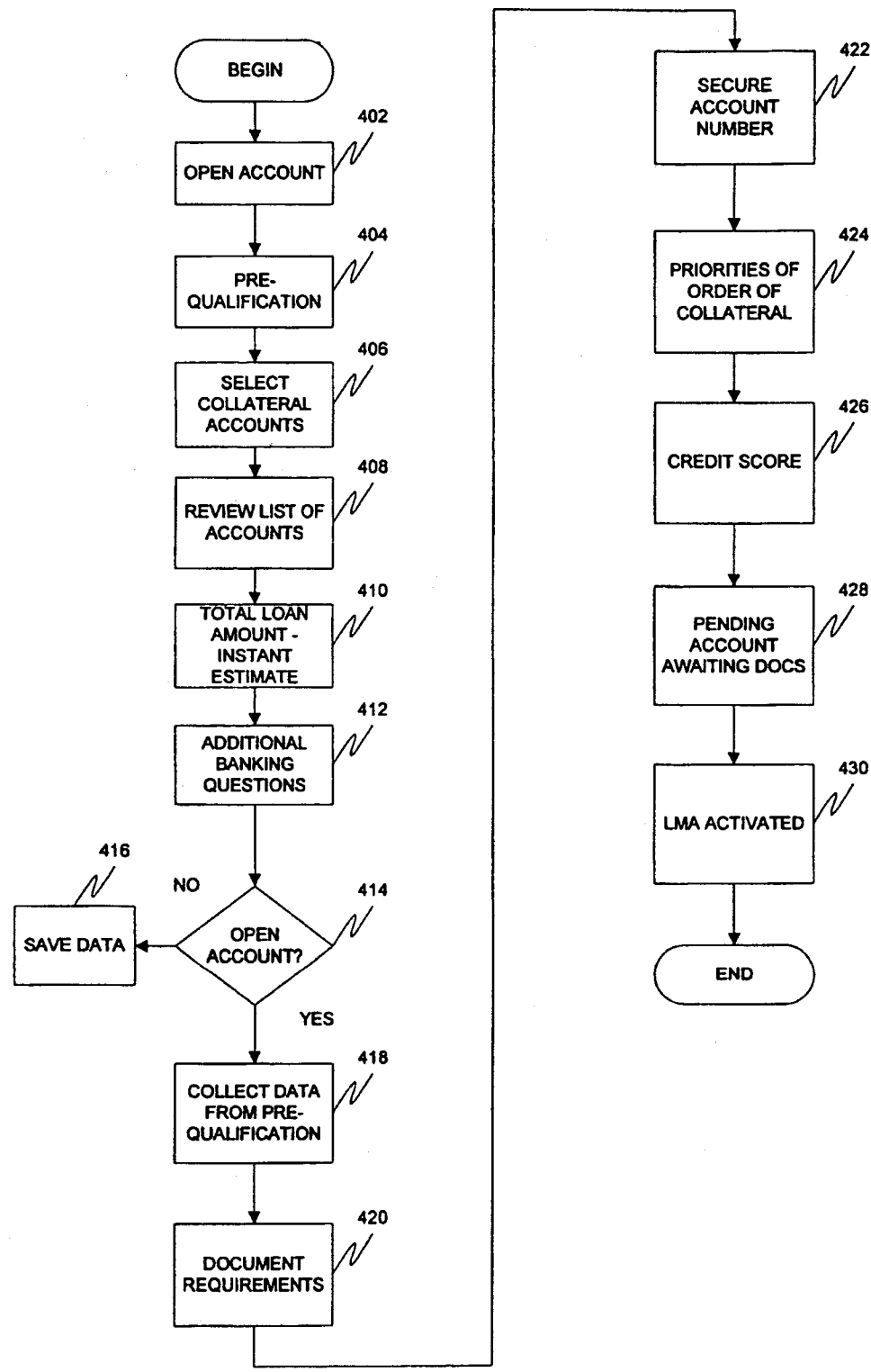
FIG. 4 is a flow diagram schematically illustrating a process for opening a loan account in accordance with one embodiment.

FIG. 4 illustrates a process for opening a loan account in accordance with one embodiment. At 402, a client (applicant) who already has several asset accounts at a financial institution initiates a request to open a loan account within the same financial institution. At 404, a prequalification or analysis process is performed based on the social security number of the applicant to determine and match eligible collateral accounts at the financial institution. At 406, one or more eligible collateral accounts are selected to be pledged against the loan account. The applicant also inputs the desired amount that he/she wishes to borrow against the pledged eligible collateral accounts. At 408, the pledged eligible collateral accounts are reviewed in more detail to determine their suitability and risk assessment. At 410, an estimate of a total loan amount is returned based on the review at 408. The estimate includes a breakdown by account, exclusion notes, a list of required documents. At 412, the applicant may be asked additional banking questions such as the purpose of the loan. The applicant can decide at 414 whether to proceed with opening the loan account based on the estimated total credit available amount. If the applicant decides to end the process at this point, the preceding information and data are saved for potential future use at 416.

If the applicant proceeds with the opening of the loan account, the information obtained at the pre-qualification or analysis stage (social security number, address, collateral account numbers, etc. . . . ) are forwarded to the formal account opening process at 418. The applicant will then have to submit required documents (third party pledgors, ownership issues). The system secures a loan account number for the applicant at 422. The collateral accounts pledged by the applicant are linked with the loan account at 424. The loan account may also be used as an overdraft account for the pledged collateral accounts.

At 426, a credit score and credit report of the applicant may also be obtained. All required documents submitted by the applicant along with the credit score and report of the applicant are reviewed for approval at 428. At 430, the loan account is activated.

Figure 5A:
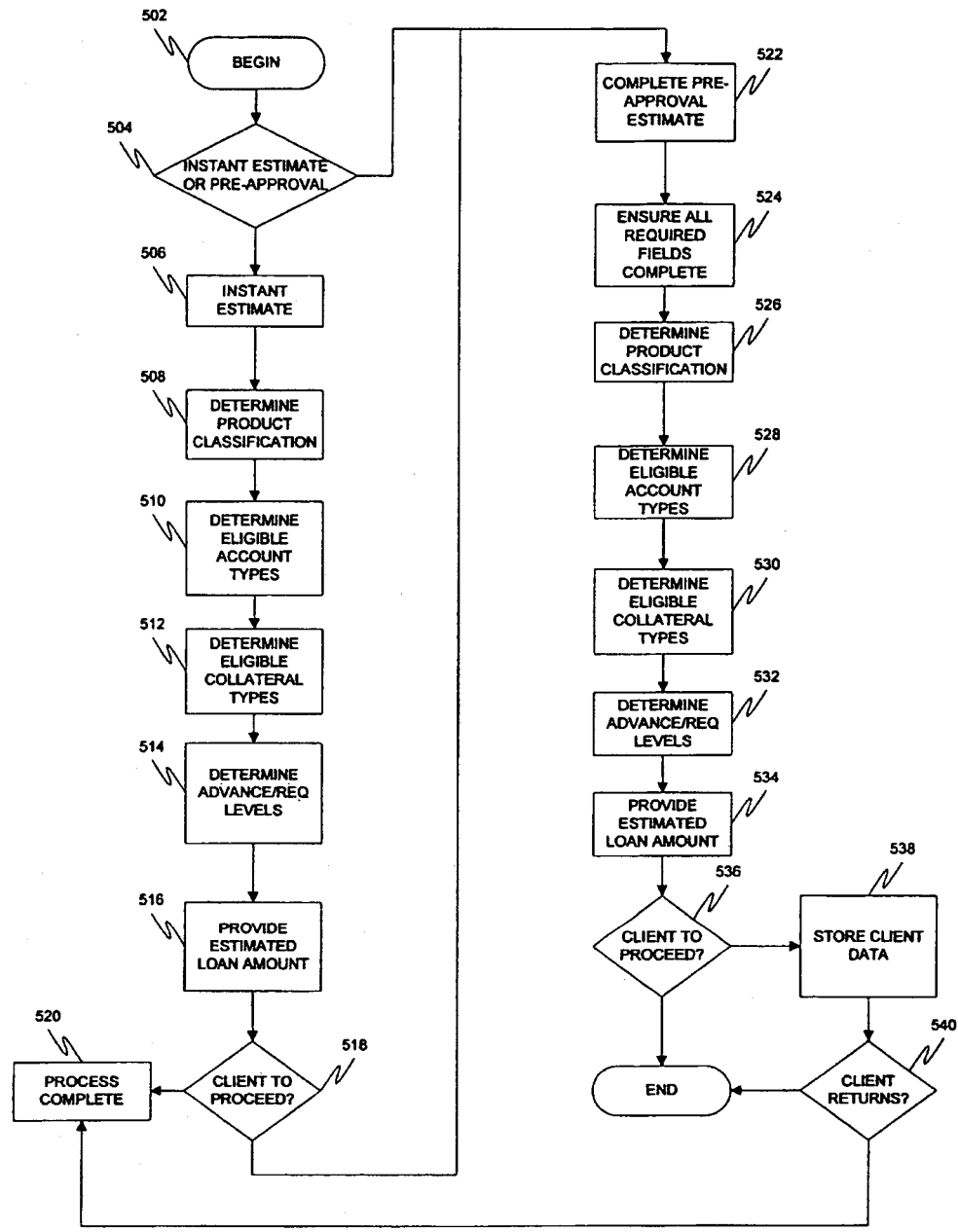
FIG. 5A is a flow diagram schematically illustrating another process for opening a loan account in accordance with another embodiment.
Figure 5B:
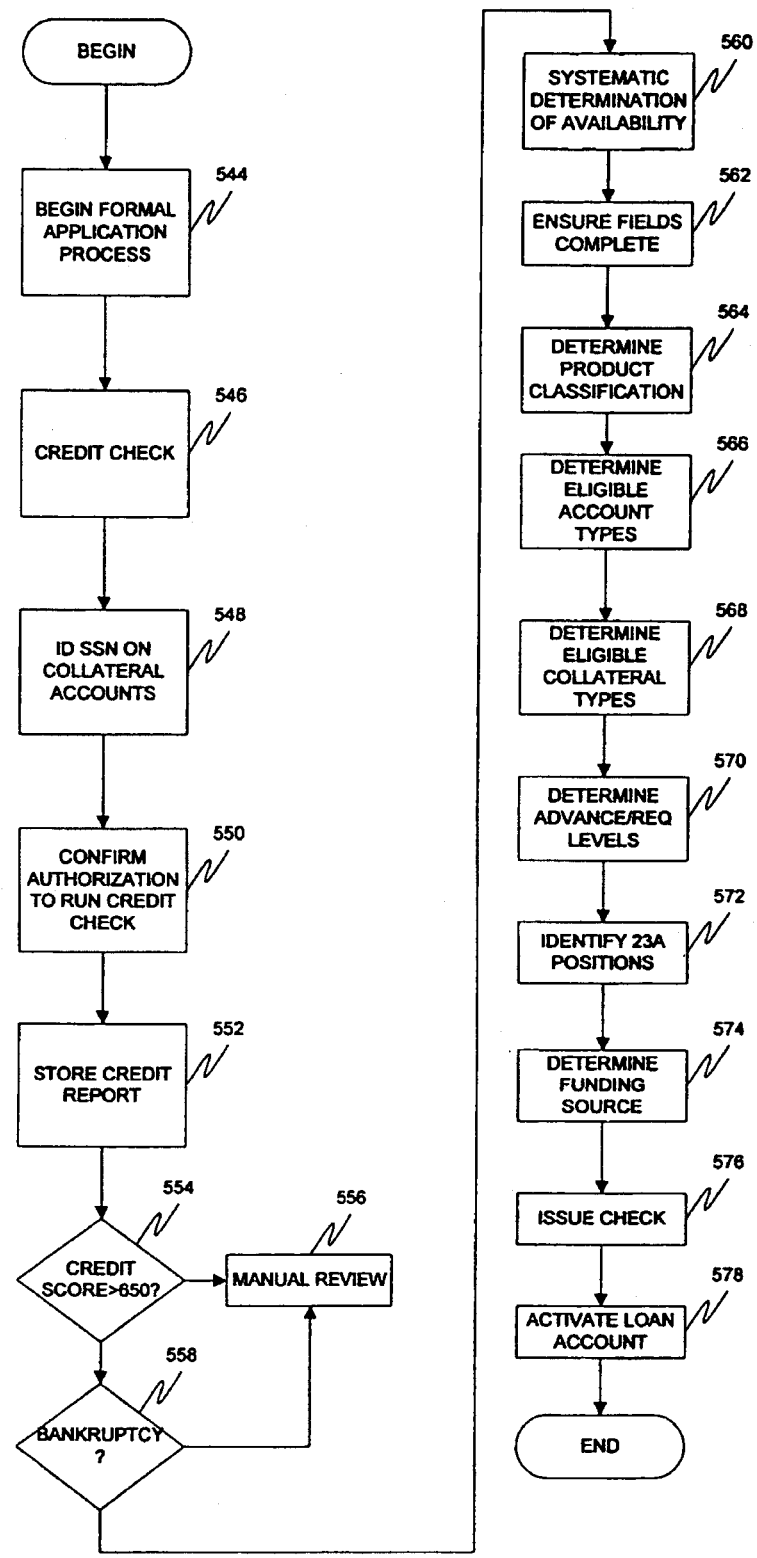
FIG. 5B is a flow diagram schematically illustrating another process for opening a loan account in accordance with another embodiment.

FIG. 5 is a flow chart illustrating another example of a process for opening a loan account with a financial institution. At 502, a client (applicant) who already has several asset/collateral accounts with the financial institution initiates a request to open a loan account with the same financial institution. At 504, a selection option allows a financial advisor on behalf of the financial institution to choose either an instant estimate or to skip to a complete pre-approval. The instant estimate requires minimal input from the client and the system ensures that all accounts and collateral are acceptable to pledge and obtains any additional information that may be required from the client. In the complete account opening process, the system ensures that all accounts and collateral are acceptable to pledge and obtains any additional information that may be required from the client. In addition, the system checks for third party pledgors, ownership issues, and several other flags that require additional documentation and/or additional information from the client. This alleviates the financial advisor from having to place several calls to the client throughout the application process as most issues are identified during the initial loan request call.

The optional instant estimate is performed by an automated approval process which includes a systematic evaluation tool combined with an electronically requested credit report. At 506, the input may consist of the client name, account numbers to be used as collateral, requested amount of the loan. At 508, the system classifies the collateral accounts according to the type of product. At 510, the system determines eligible account types. At 512, the system determines eligible collateral types. At 514, the system determines and applies the advance and maintenance levels (as previously discussed) based on the types of eligible collateral. At 516, the system outputs the estimated loan amount which is not to be construed as a commitment to lend. At 518, the client can decide whether to proceed with the formal loan request. The process ends at 520 if the client chooses not to open the loan account.

The complete account opening process starts at 522 where all required data fields must be completed. For example, inputs may include but are not limited to the following: client name, account numbers of collateral accounts, requested amount of loan, social security number, current address, annual income, net worth, occupation, affiliations, whether the client is an officer, director, or 10% owner of the outstanding shares, whether the client has access to inside information as an employee, etc. . . . The system ensures at 524 that all required fields are completed by including a breakdown of required fields by product types and then all possible special situations within each product. The process continues in the same manner by determining product classification at 526, determining eligible account types at 528, determining eligible collateral types at 530, and determining and applying advance and maintenance levels (as previously discussed) based on the types of eligible collateral at 532. At 534, the system outputs the estimated loan amount which is not to be construed as a commitment to lend. At 536, the client can decide whether to proceed with the formal loan request. If the client decides to end the process, the system stores the client data for a limited period of time such as 30 days at 538. If the client does not re-apply for the loan account within the limited period of time at 540, the process ends at 520.

Possible returns of the instant estimate and complete pre-approval processes may include either a suggested, possible loan amount is returned, or further review is required before approval is granted. Along with the message of further review is a list of reason codes which may help to identify why a manual review is required. This is now a manual review by the loan officer or financial advisor.

The formal application process begins at 544. A systematic credit check of the client starts at 546. At 548, the system identifies all unique, primary social security numbers listed on all collateral accounts being used to support the loan request. At 550, the system confirms authorization to run credit check for all pledgors. If there is no authorization to run a credit report on the primary social security number for the pledge account, the system may not allow that collateral account to be pledged. At 552, the credit report is stored and available for documentation purposes. A real-time credit report is pulled from the credit bureaus and a credit report is obtained which provides the following elements: credit risk score, bankruptcies, tax liens, court judgments, past due amounts. At 554, the credit score is then compared to a pre-determined number, for example 650. If the credit score is less than the predetermined number, a manual review is triggered at 556. At 558, the existence of bankruptcy will generate in most cases a rejection and trigger a manual review at 556. At 560, the system determines if the loan can be systematically approved using the rules previously defined by ensuring all required fields are complete at 562, determining product classification 564, determining eligible account types at 566, determining eligible collateral types at 568, determining advance/maintenance levels and applying to collateral at 570, and identifying any regulatory rules compliance such as Regulation 23A positions at 572. Regulation 23A places restrictions on certain transactions between a bank and its affiliates. The system should monitor for pledged accounts that contain 23A covered securities and transactions. The system includes a 23A compliance component of the collateral monitoring system. At 574, the system determines funding source of collateral accounts. At 576, the system issues checks and activates the loan account at 578.

FIGS. 6A, 6B, 6C, 6D, and 6E illustrate an example of the collateral monitoring process and requirements. The collateral monitoring or also known as risk management process includes monitoring collateral for individual loans, call identification, call resolution, concession processing and tracking, collateral liquidation, problem loan identification, and portfolio monitoring. Information collected from the borrower and pledgor is used in the monitoring process. Collateral monitoring includes the ability to be able to view daily valuations of each collateral position as well as aggregate positions for both the individual borrower and on various consolidated views. The system should be able to post daily prices for each security or account type and to show the value assigned for both the advance and maintenance purposes.

Figure 6A:
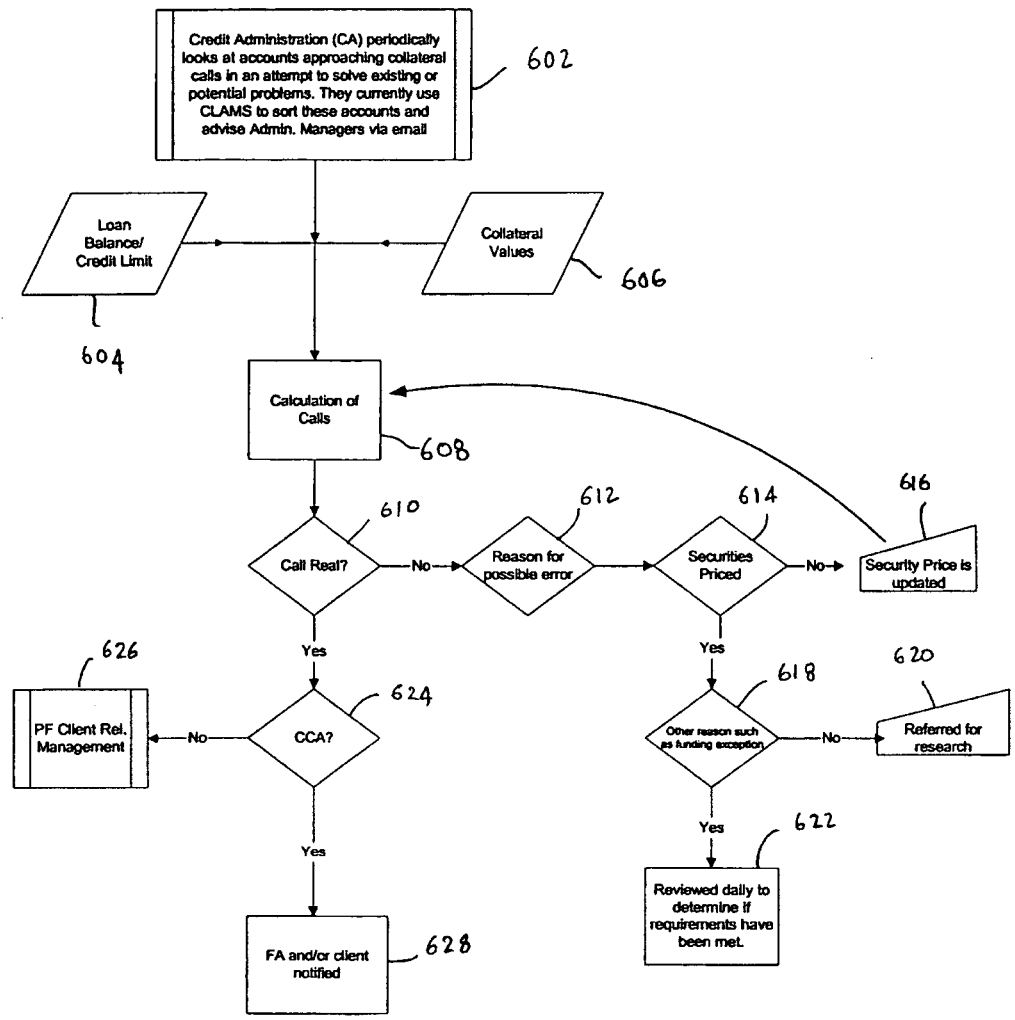
FIG. 6A is a flow diagram schematically illustrating a risk management process in accordance with one embodiment.

In FIG. 6A, at 602 credit administration (CA) periodically look at collateral accounts approaching collateral calls in an attempt to solve existing or potential problems. Both loan balance and credit limit at 604 and collateral values at 606 are used in calculating calls at 608. At 610, the system determines whether the call is real. If the call is not real, the system investigates reasons for possible error at 612. The system determines whether the securities are priced at 614. The price of the securities is updated at 616 and a calculation of the calls is again performed at 608. If the securities are priced, the system investigates other reasons such as a funding exception at 618. At 620, a referral for further research is sought if there are no other possible reasons for error. If another possible reason for error exists, the system reviews to determine if requirements have been met at 622.

If the call is real, the system determines the level of established clientele at 624. For example, the system may refer a well established client to a client relation management team at 626, otherwise, the system may alert a financial advisor or directly notify the client at 628.

Figure 6B:
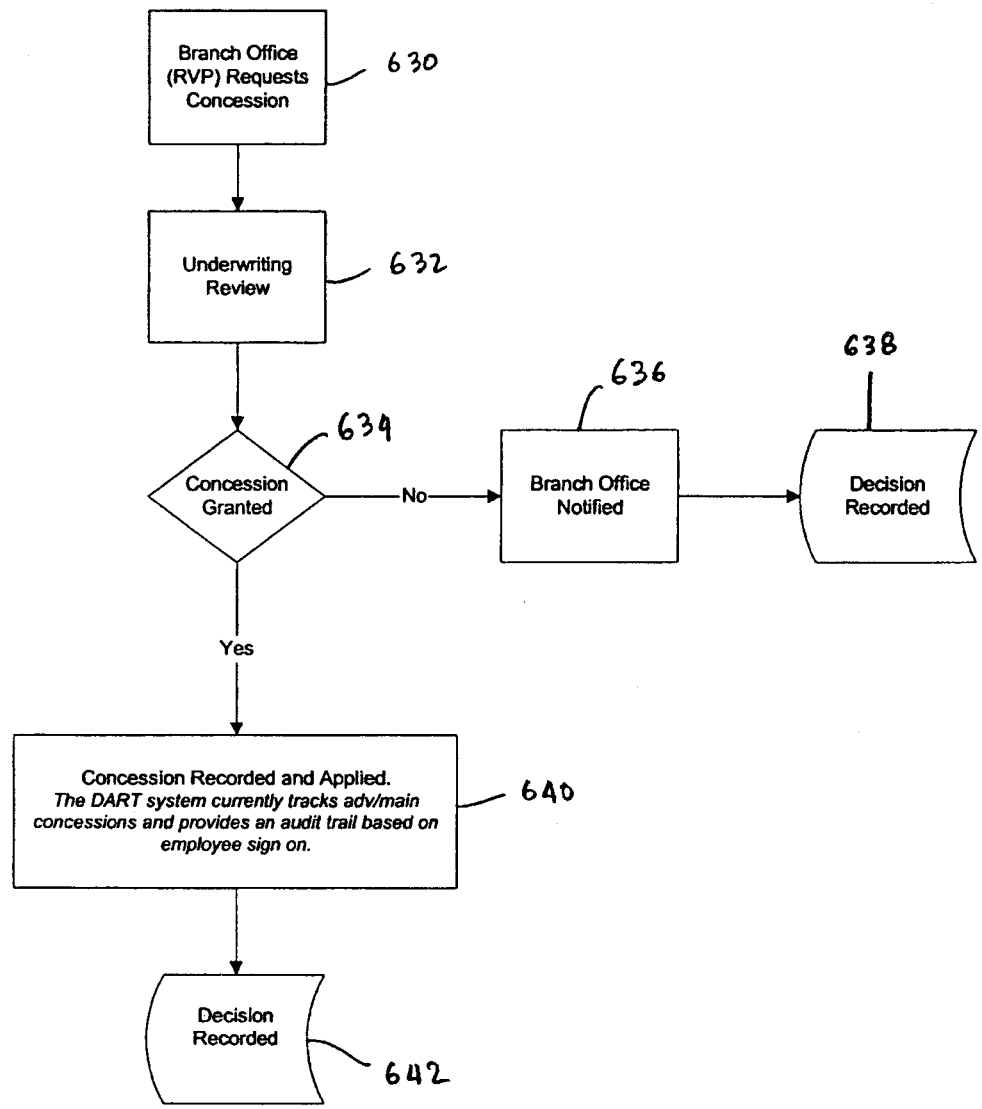
FIG. 6B is a flow diagram schematically illustrating a concession process in accordance with one embodiment.

FIG. 6B illustrates an example of a concession processing. At 630, a branch office requests a concession. An underwriting review is processed at 632. If the concession is determined to be granted at 634, the concession is recorded and applied at 640. The corresponding decision of the concession is recorded at 642. If the concession is not granted at 634, the branch office is notified at 636 and a corresponding decision is recorded at 638.

Figure 6C:
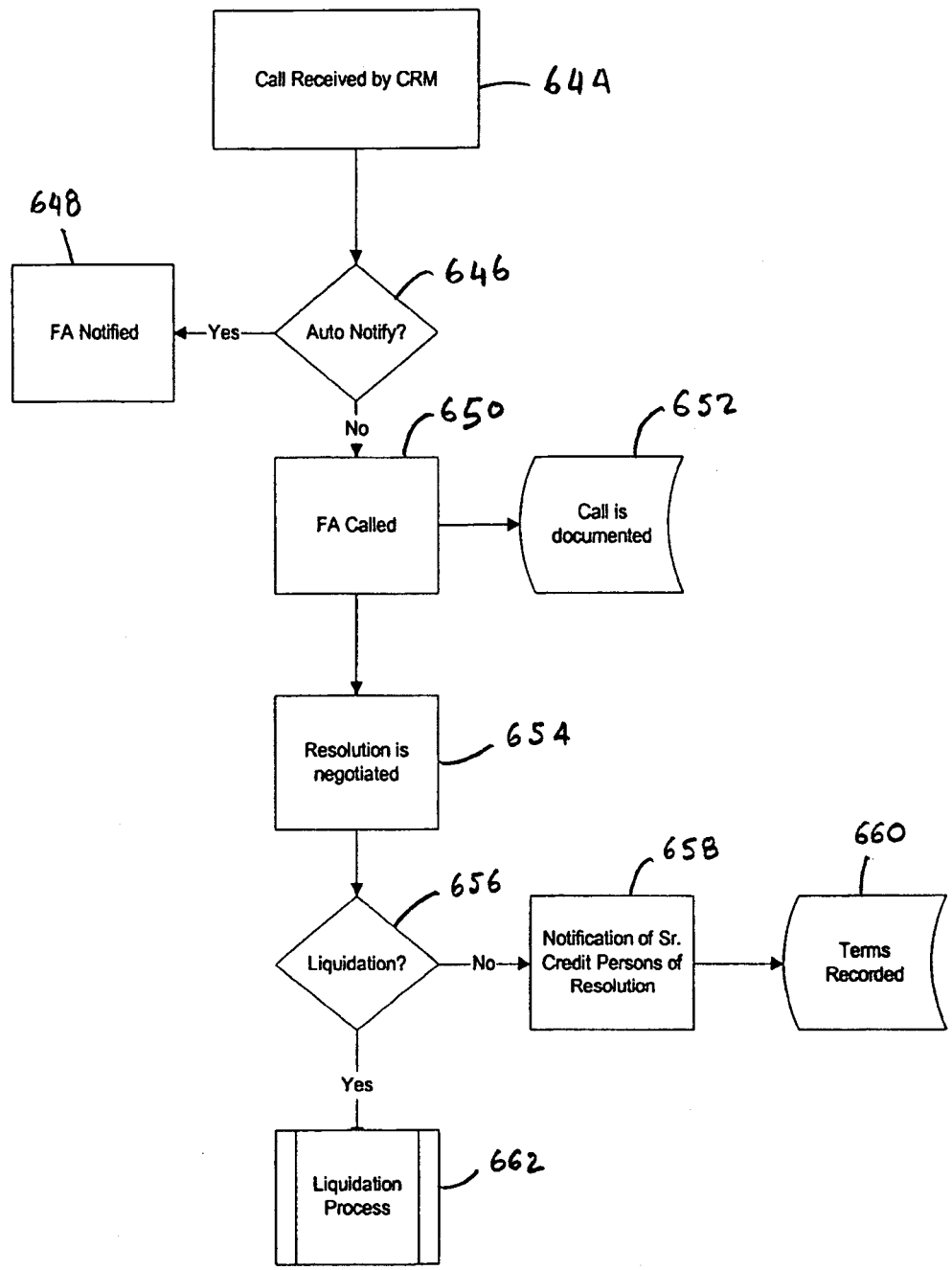
FIG. 6C is a flow diagram schematically illustrating a call notification process in accordance with one embodiment.

FIG. 6C illustrates an example of a call notification for a well-established clientele. At 644, a call is received. If the Financial Advisor (FA) has enabled the automatic notification at 646, the FA is notified at 648. Otherwise, the FA is called at 650 and the corresponding call is documented at 652. A resolution is negotiated at 654 and a determination of whether to liquidate at 656 is made. A liquidation may proceed at 662 or a notification of a senior credit persons of resolution is placed at 658. The terms of the resolutions are recorded at 660.

Figure 6D:
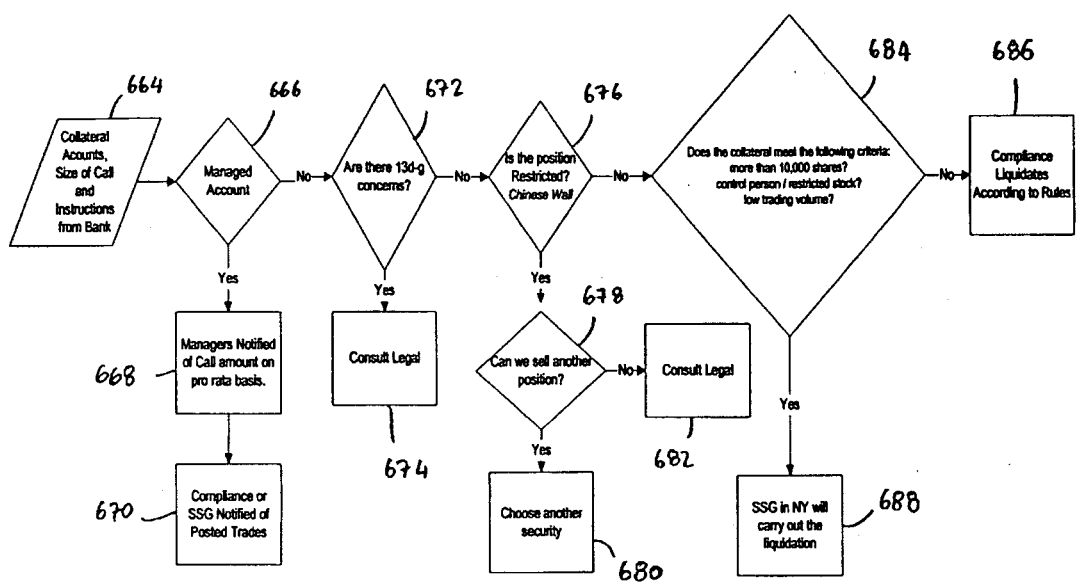
FIG. 6D is a flow diagram schematically illustrating a liquidation process in accordance with one embodiment.

FIG. 6D illustrates an example of a liquidation process. Collateral accounts and the size of the call and instructions are received at 664. If the collateral accounts are managed account at 666, the managers are notified of the call amount on a pro rata basis. Compliance or notification of any trade is posted at 670. If there are any 13D-G regulatory concerns at 672, the system refers the client to the legal department at 674. If the position in the collateral accounts is deemed restricted at 676, the system attempts to sell another position at 678. Accordingly, another security is chosen and sold at 680. If no other position can be selected, the system refers the client to the legal department 682. If the collateral meet the following criteria: more than 10,000 shares, control person/restricted stock, low trading volume, then the liquidation may be carried out in New York. Otherwise, a portion of the collateral accounts satisfying the call is liquidated according to the compliance rules at 686.

Figure 6E:
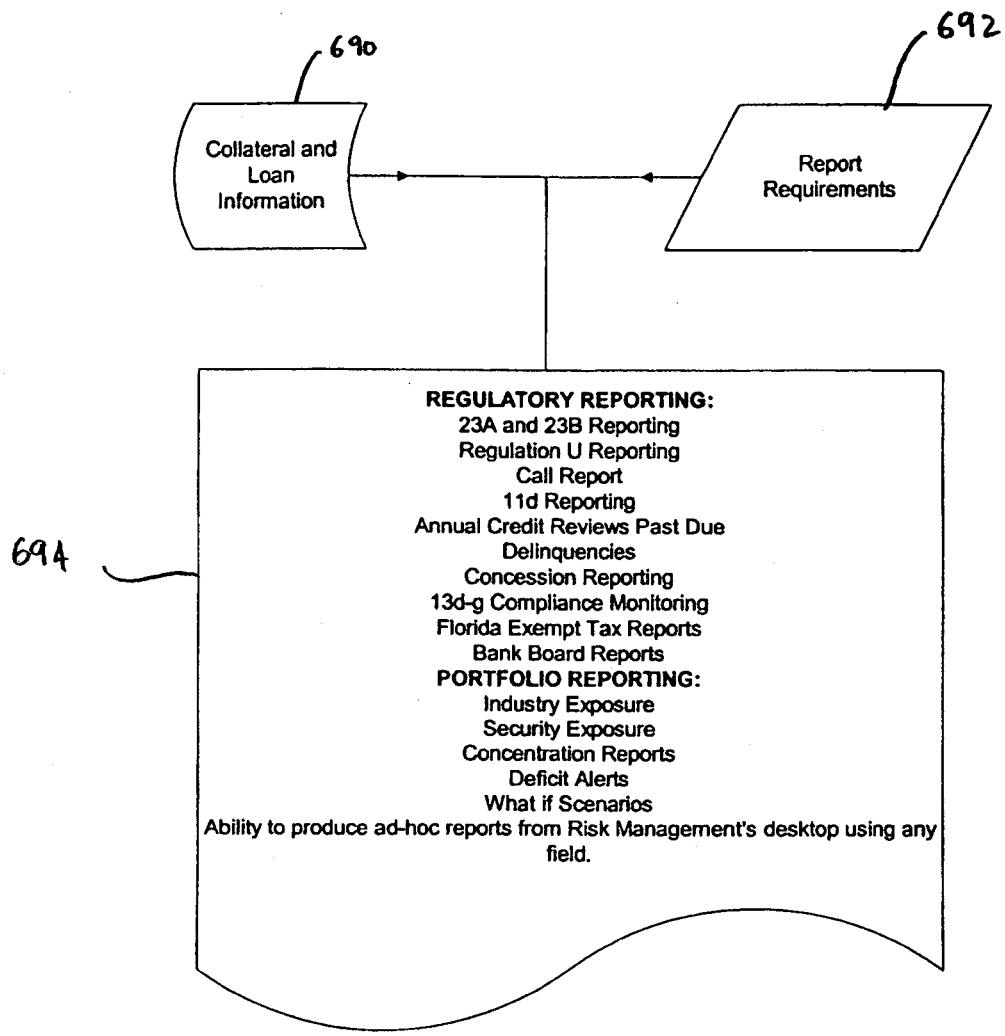
FIG. 6E is a flow diagram schematically illustrating a portfolio monitoring and regulatory reporting process in accordance with one embodiment.

FIG. 6E illustrates an example of a portfolio monitoring and regulatory reporting process. The collateral and loan information at 690 in combination with the report requirements at 692 are used for regulatory reporting and portfolio reporting at 694.

To further illustrates how the system operates, the following is an example of a case scenario of a client seeking a credit line for a non-purpose loan. The client has two collateral accounts: one securities managed account and one cash account with no margin trait.

On day 0, the client calls his/her Financial Advisor (FA) to find out more about the Loan Management Account (LMA) product. The FA discusses the benefits and risks of an LMA for this particular client.

Figure 7:
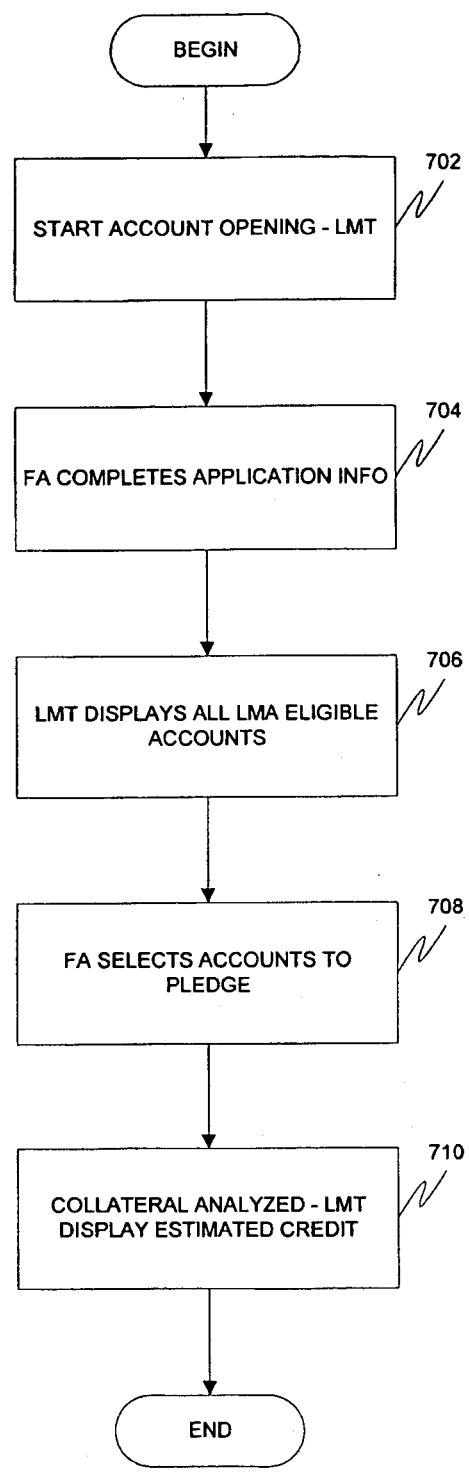
FIG. 7 is a flow diagram schematically illustrating a process for opening a loan account in accordance with one embodiment.
Figure 8A:
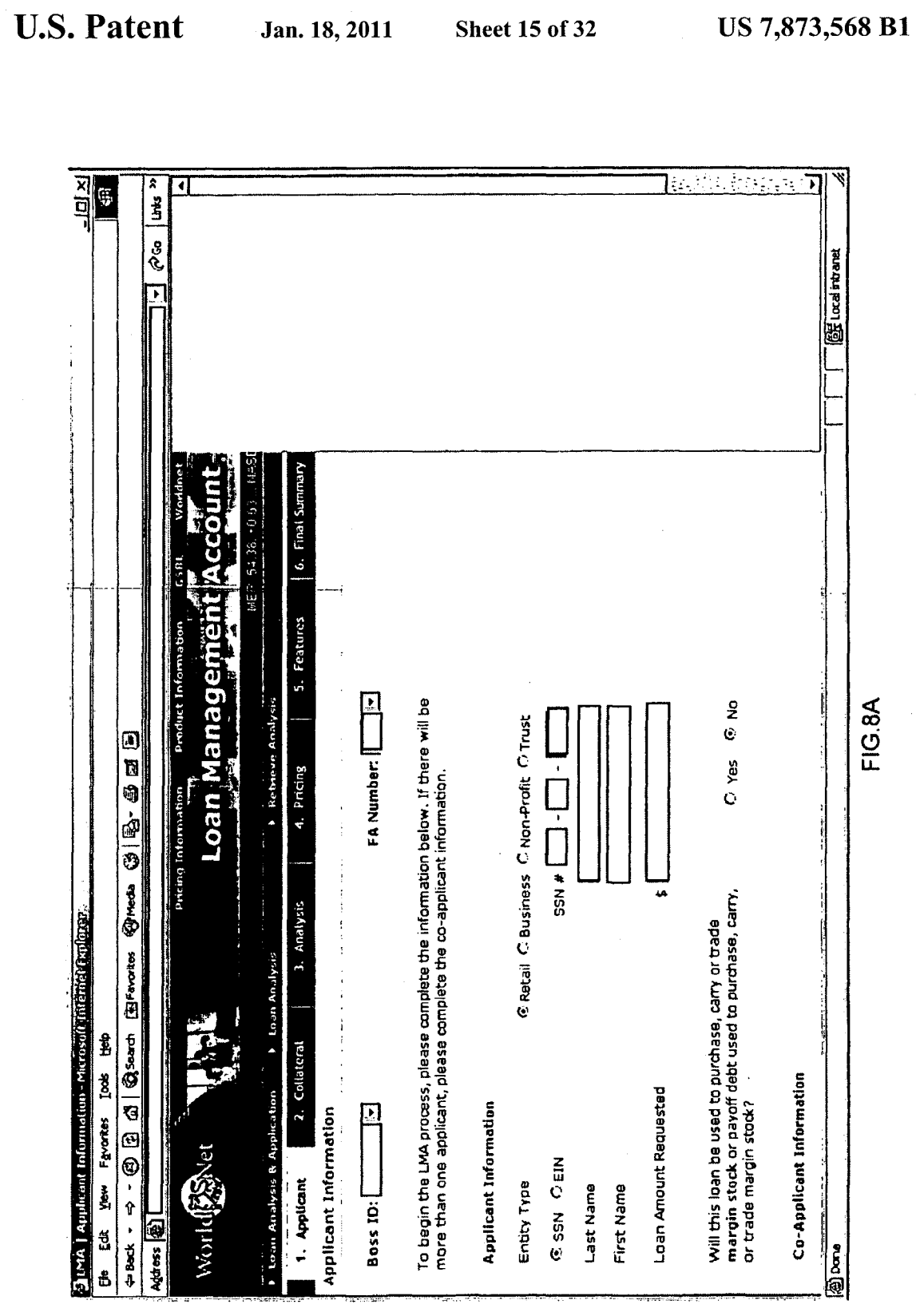
Figure 8E:
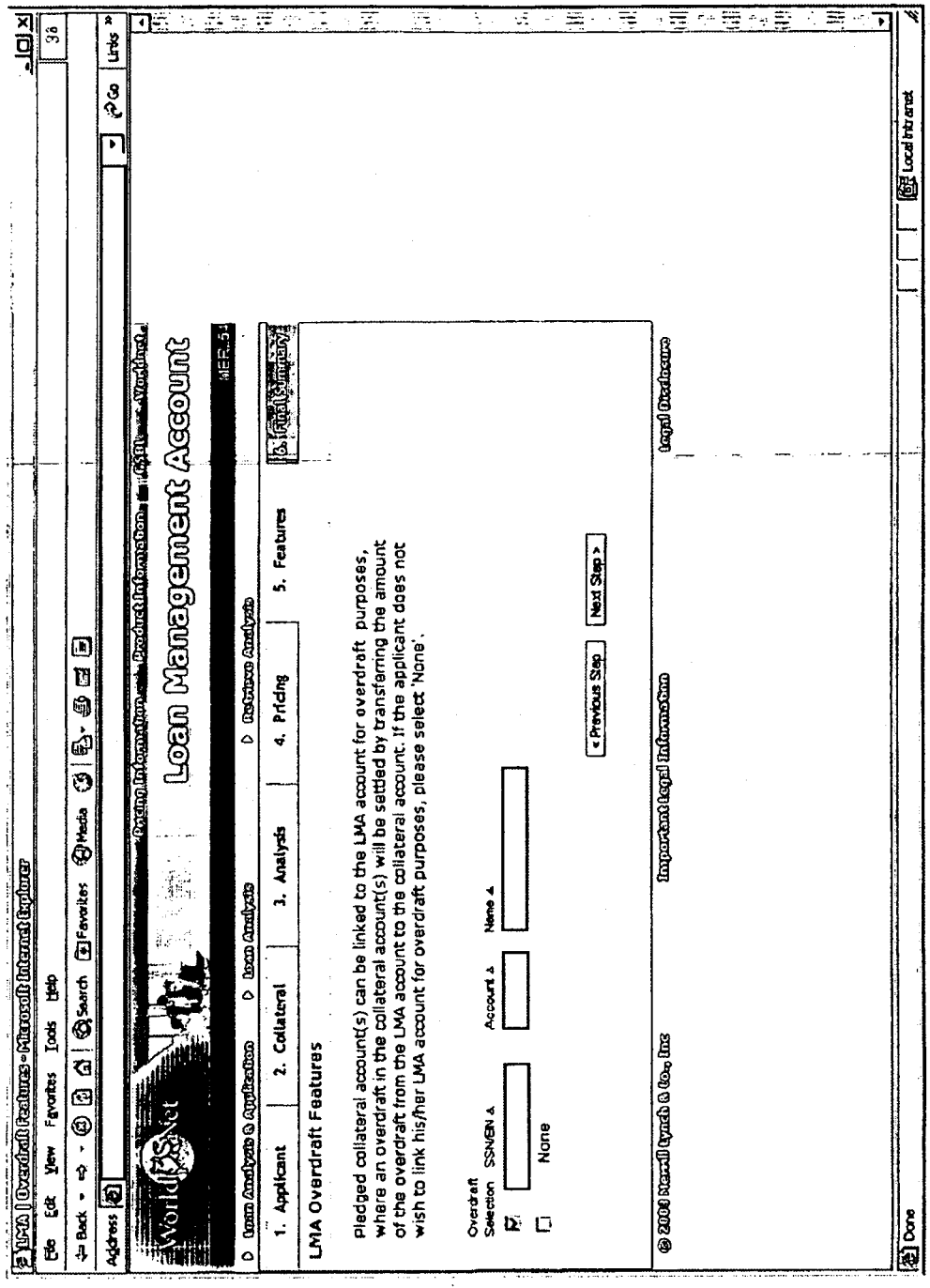
Figure 8G:
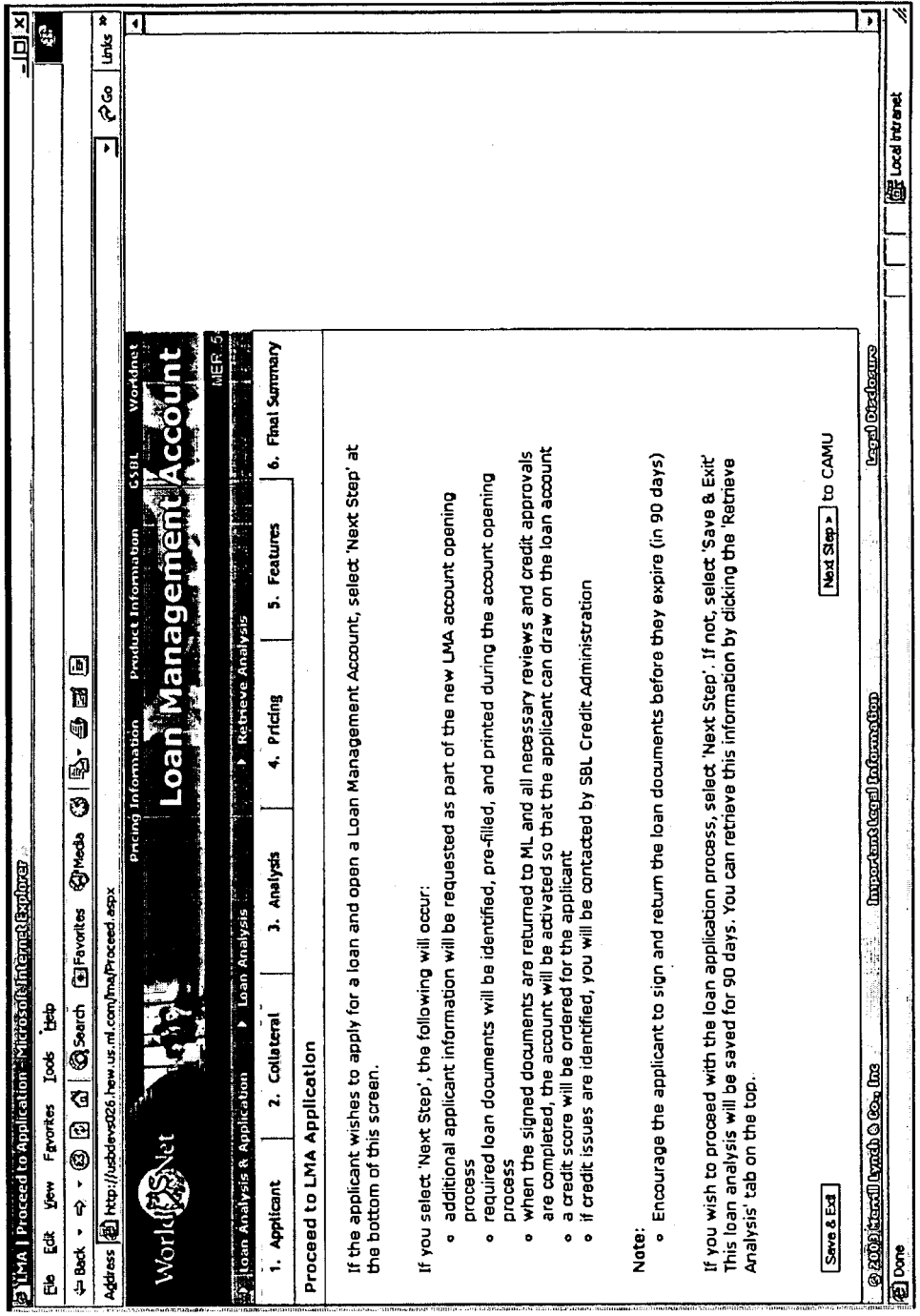
Figure 8B:
Figure 8B:
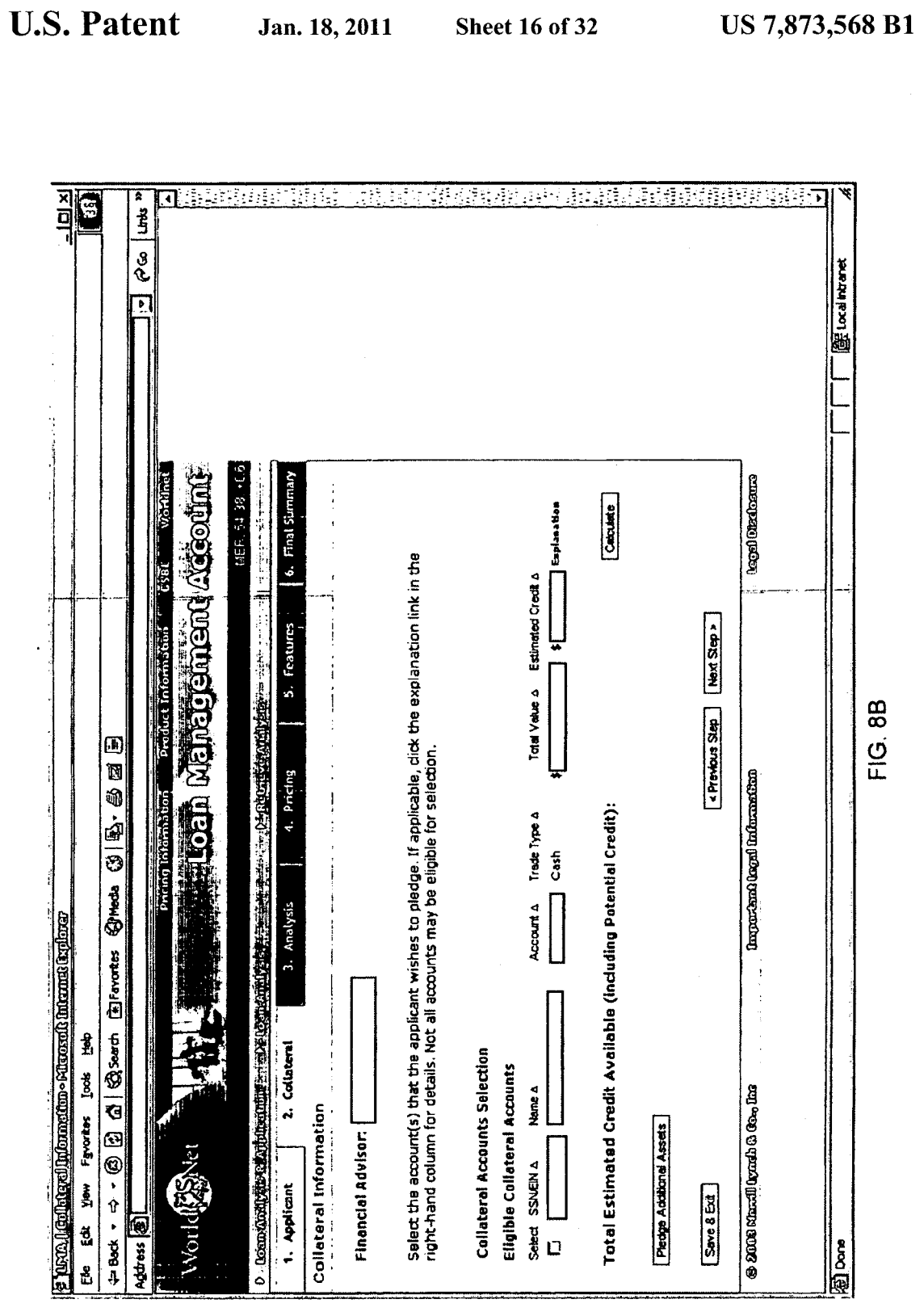
Figure 8D:
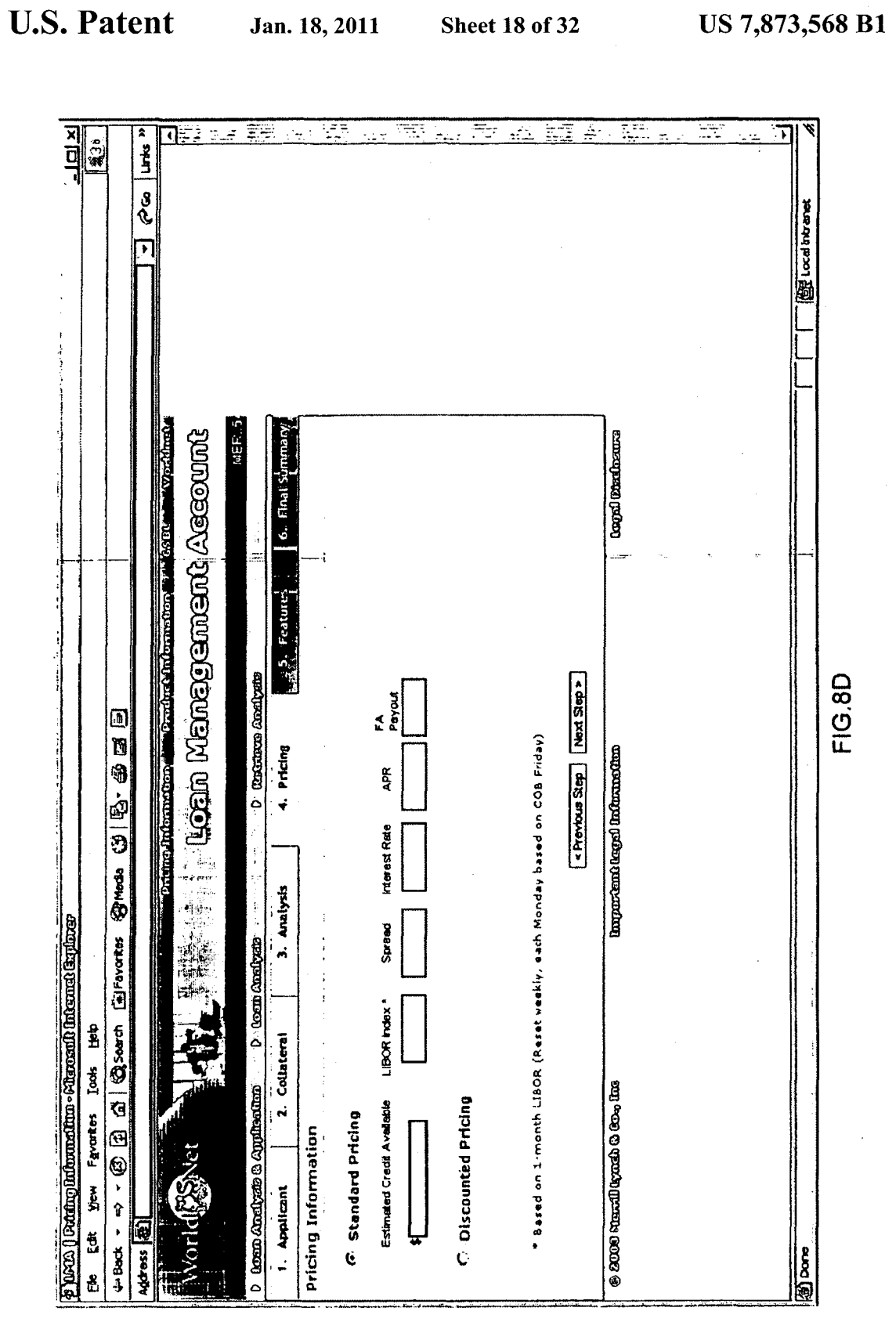
Figure 8E:
Figure 8F:
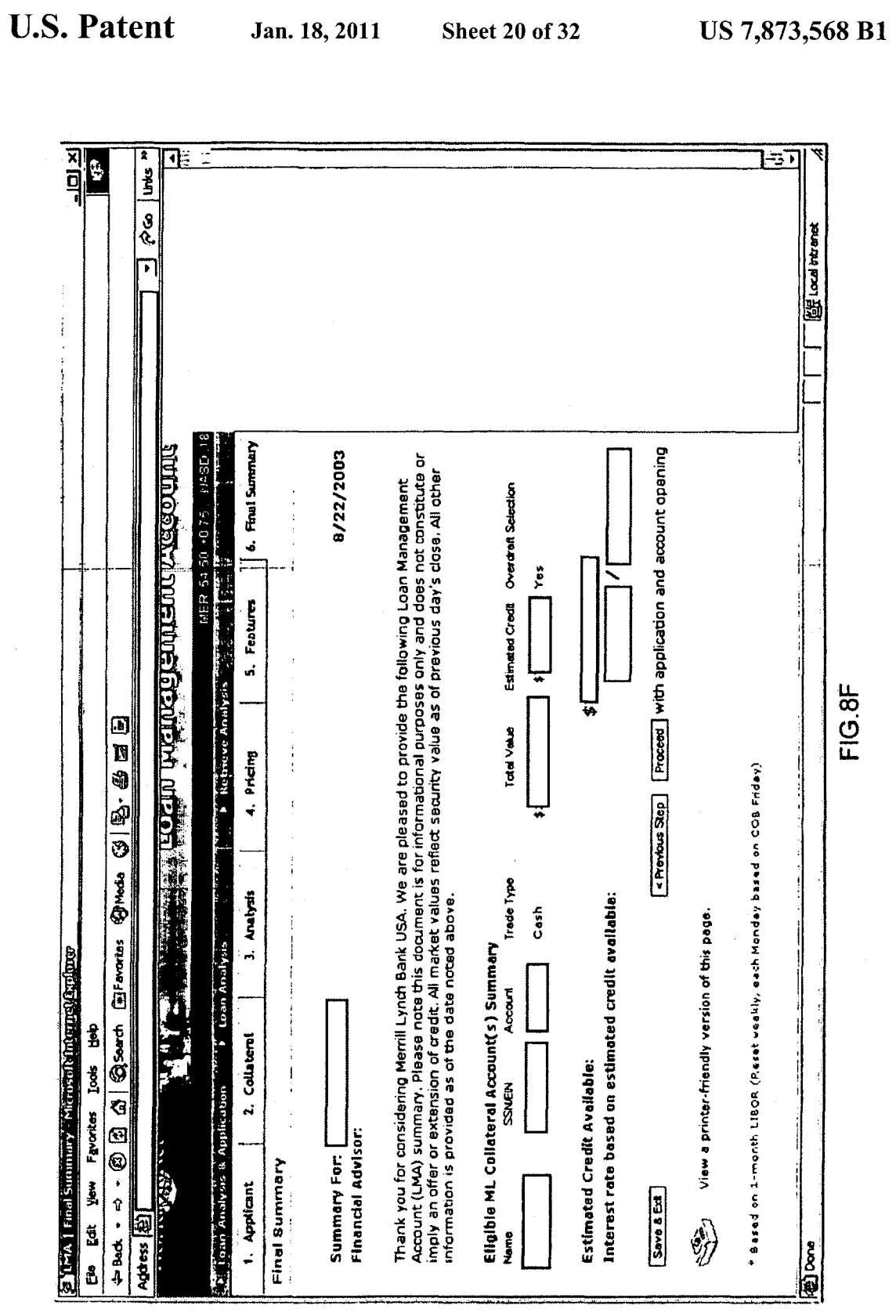

On day 1, the client contacts the FA to go forward with opening an LMA. The FA accesses a Loan Modeling Tool (LMT) stored in the system to begin the account opening process as previously described. FIG. 7 illustrates an example of the account opening process. At 702, the FA accesses the system. At 704, the FA completes the application info panel. An example of a display of the application interface is illustrated in FIG. 8A. At 706, the LMT displays all eligible accounts owned by the client. An example of a display of the eligible accounts is illustrated in FIG. 8B. At 708, the FA selects accounts that the client wants to pledge as collateral. At 710, the pledged collateral are analyzes and the LMT displays the estimated credit limit according to the standard advance levels. An example of a display of the application interface is illustrated in FIG. 8C. An example of a display of a pricing of the line of credit is illustrated in FIG. 8D. The rate is displayed along with the Index, Spread, APR and FA payout. FIG. 8E illustrates an example of a display of an overdraft feature of the LMA. The LMT allows the FA to choose the collateral account for which the client requests the overdraft feature through LMA. FIG. 8F illustrates an example of a display of a final summary page. FIG. 8G illustrates an example of a display of an interface to the formal application process.

Figure 9:
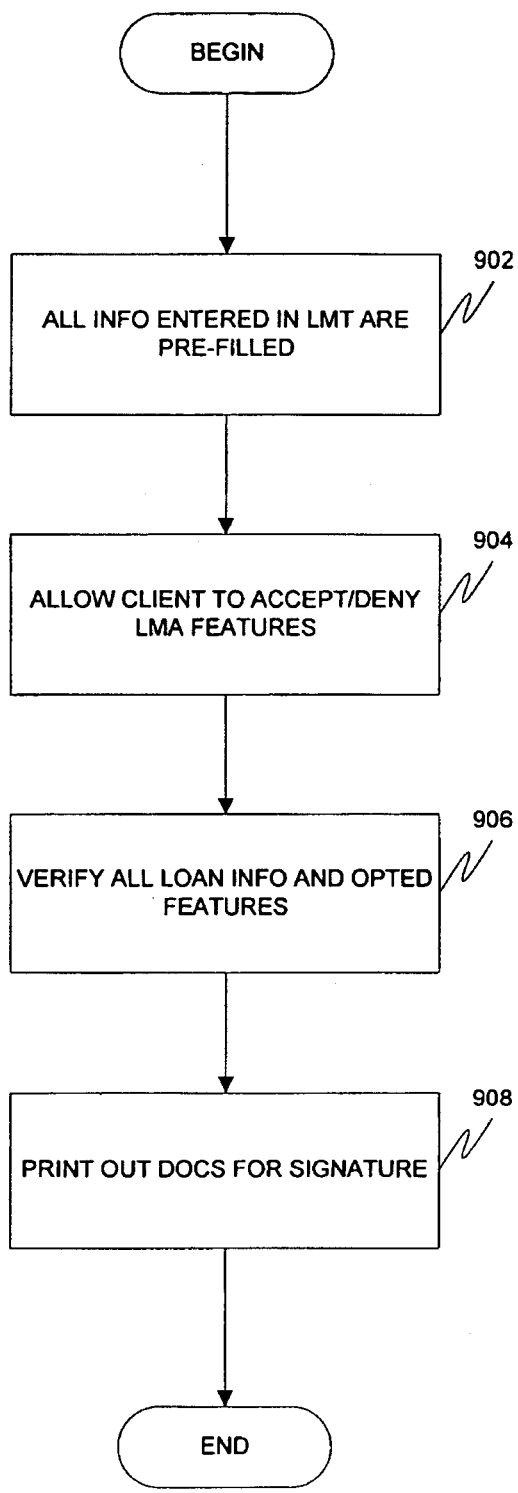
FIG. 9 is a flow diagram schematically illustrating an example of a client applying for a loan account in accordance with one embodiment.

FIG. 9 illustrates a process (CAMU) for proceeding with a formal account opening and loan application following the LMT. At 902, all information entered into the LMT are prefilled into CAMU. At 904, the client is allowed to accept or deny LMA features such as convenience checks, MLOL, and FTS. At 906, the process verifies all loan information and opted features. At 908, the following documents are made available and sent to the client for signature: client welcome letter, global privacy pledge, loan management account agreement, LMA application, Federal Reserve form u-1, collateral account agreement, risk disclosure.

On day 2, the client returns the signed documents to the branch of the financial institution. Regulation B clock begins when the documents are received and photocopied.

Figure 10:
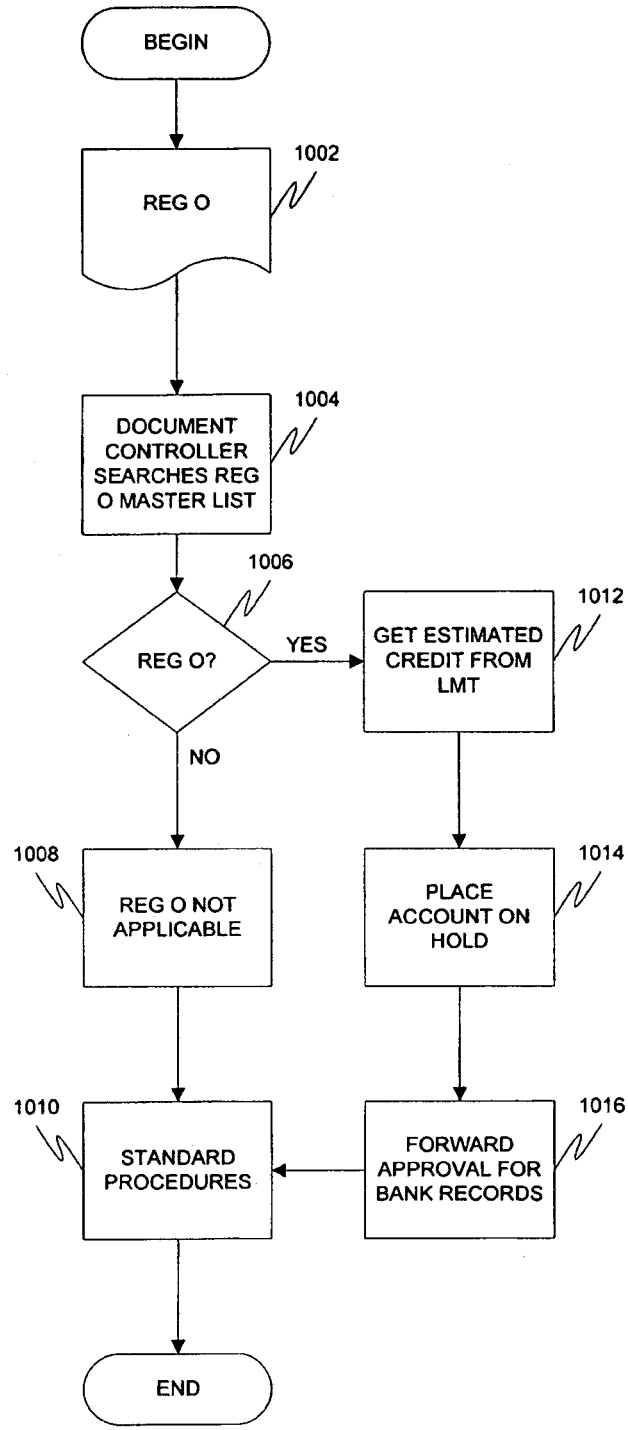
FIG. 10 is a flow diagram schematically illustrating an example of process for regulatory review prior to opening a loan account in accordance with one embodiment.

On day 3, the financial institution reviews the documents on-line and a Regulation O check is performed at 1002 of FIG. 10. At 1004, the document controller searches Regulation O master list for applicant/pledgor. At 1006, a determination is made as to whether Regulation O applies. A determination that Regulation O does not apply is made at 1008. In that situation, the document controller follows standard procedures. However, if Regulation O applies, the system gets an estimated available credit amount from the LMT at 1012. At 1014, the account is placed on hold and the details are forward to legal accounts counsel. At 1016, the approval if any from the legal accounts counsel are forwarded to the document controller.

Figure 11:
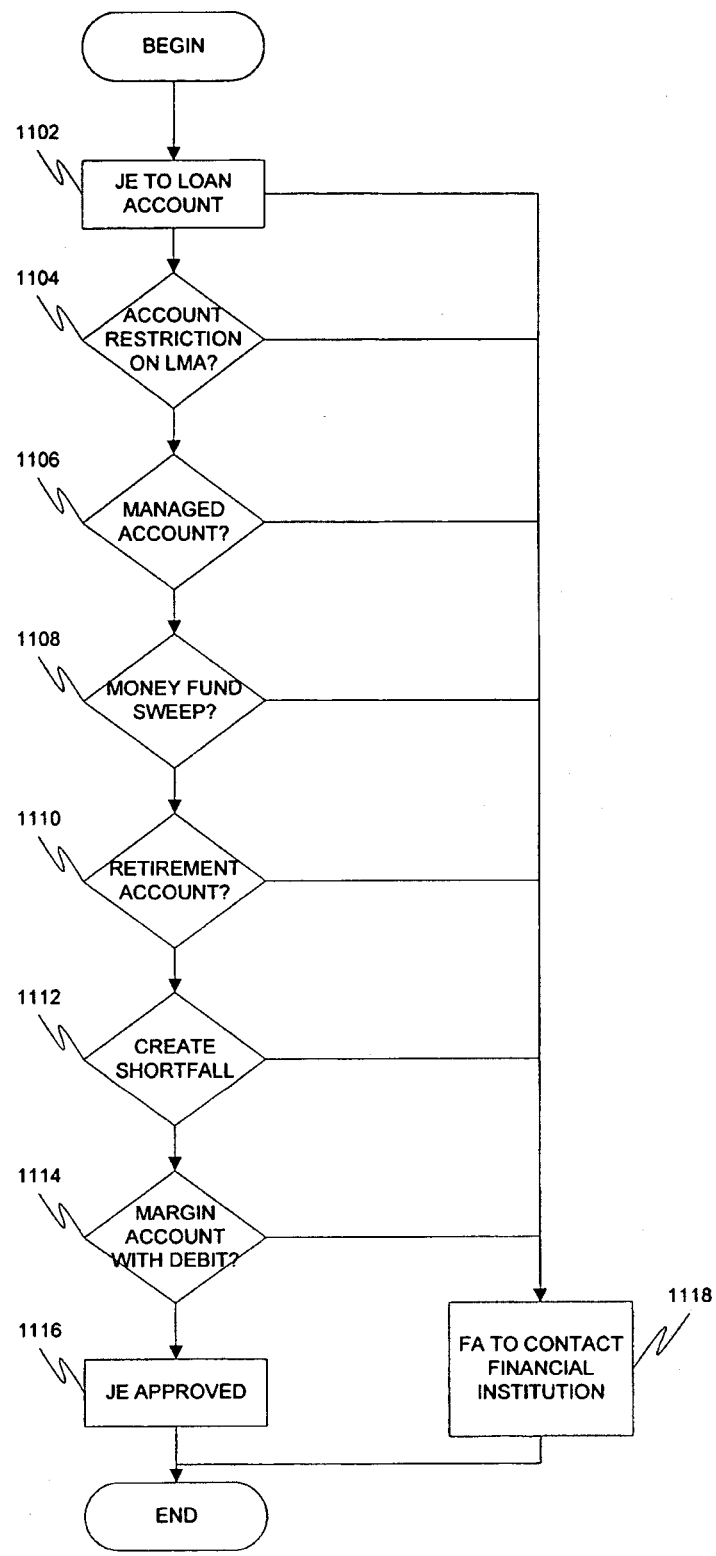
FIG. 11 is a flow diagram schematically illustrating an example of a process for a journal entry into a collateral account in accordance with one embodiment.

On day 4, the account is activated one day after approval and notice is sent to borrower. The following process occurs when a journal entry of $200,000 is entered into a non-margin CMA account at 1102 of FIG. 11. Several checks are performed: account restriction on LMA at 1104, gaining account is a managed account at 1106, gaining account has money fund sweep at 1108, retirement account at 1110, any pending trade that will create a shortfall in the account 1112, margin account with a debit at 1114. The JE is finally approved at 1116.

On day 9, the client may request to a fixed loan amount of $100,000 for one year. The FA enters a request that is routed to the bank and upon approval, the transaction is booked in ACBS. At the end of day processing, an email confirmation is sent to the FA and a letter is sent to the client.

Figure 12:
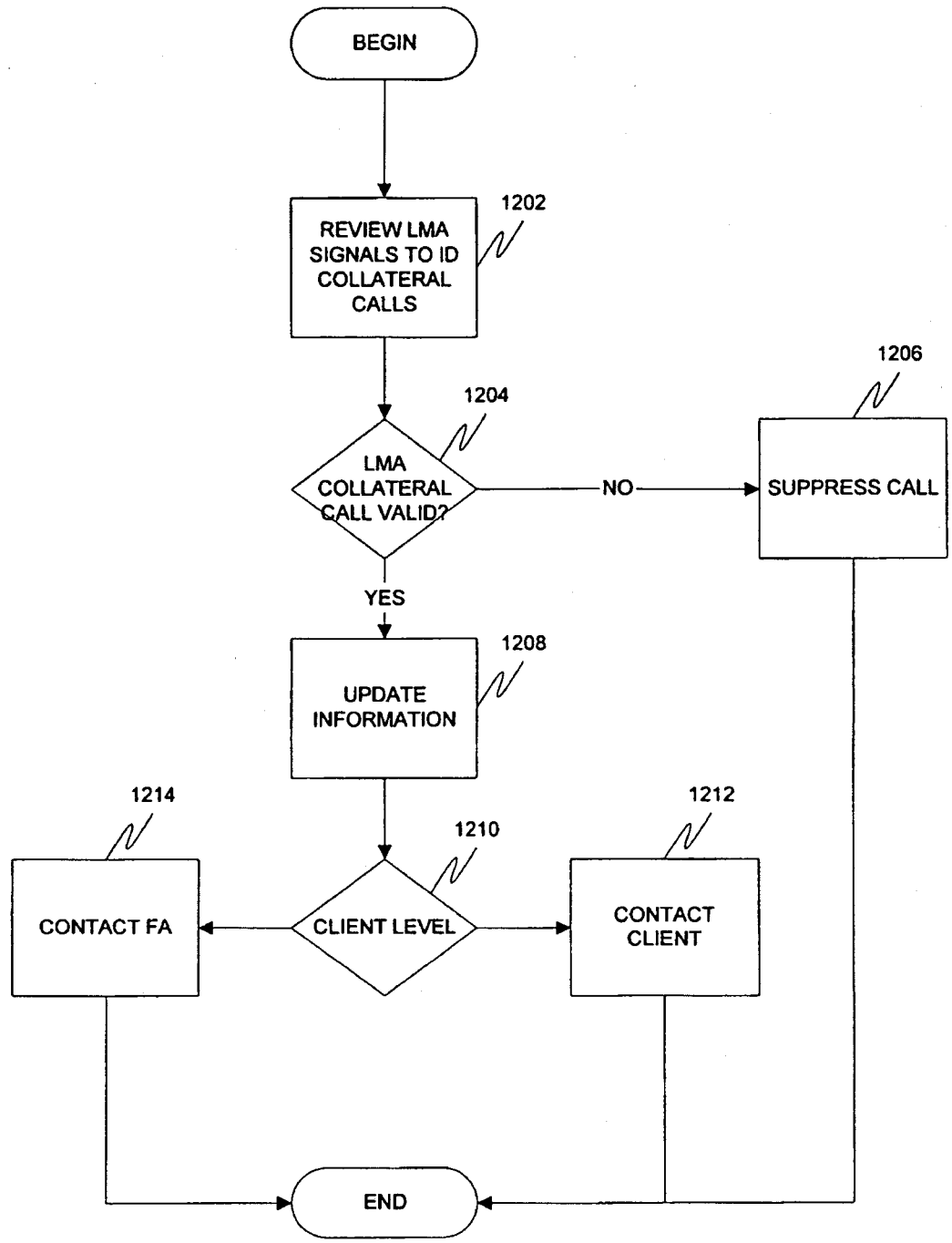
FIG. 12 is a flow diagram schematically illustrating an example of a process for issuing a collateral call in accordance with one embodiment.

On day 10, the collateral value drops and loan hits collateral call. The cash in the collateral account is pended, but is not sufficient to cover the call. In FIG. 12, the monitoring department reviews LMA on a daily basis to identify collateral calls at 1202. At 1204, a determination of whether the LMA collateral call is valid. At 1206, the monitoring department suppresses the call if the LMA collateral call is deemed invalid. If the call is valid, but the amount is incorrect, the information is updated at 1208. Otherwise, a determination of the type of client is made at 1210. A collateral call letter is mailed to the client with an email to the FA at 1212. Otherwise, the monitoring department may contact the FA by phone and email at 1214. In the present situation, the monitoring department finds the call to be valid and sends a collateral call letter to the client and an email to the FA. The adjusted call is systematically posted in the branch of the financial institution.

Figure 13:
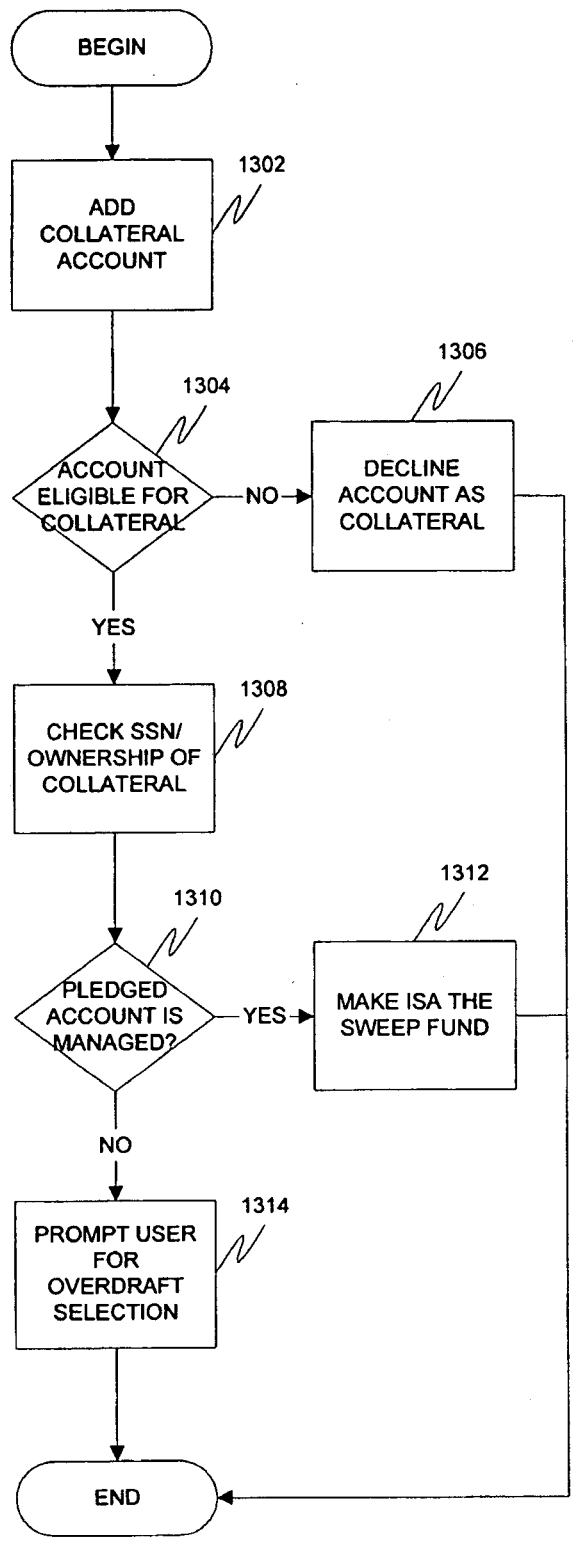
FIG. 13 is a flow diagram schematically illustrating an example of a process for adding a new collateral account in response to a collateral call in accordance with one embodiment.

On day 12, the client responds to the collateral call by adding a managed account as a new collateral account at 1302 of FIG. 13. At 1304, a determination is made as to whether the account is eligible for collateral. If it isn't, the account is declined as collateral in 1306. If it is, the system checks the social security number and ownership of the LMA and collateral account at 1308. At 1310, a determination is made as to whether the pledged account is a managed account. If it is, the collateral is account is added at 1312. Otherwise, the client is prompted for overdraft selection at 1314. The process ends at 1316.

Figure 14:
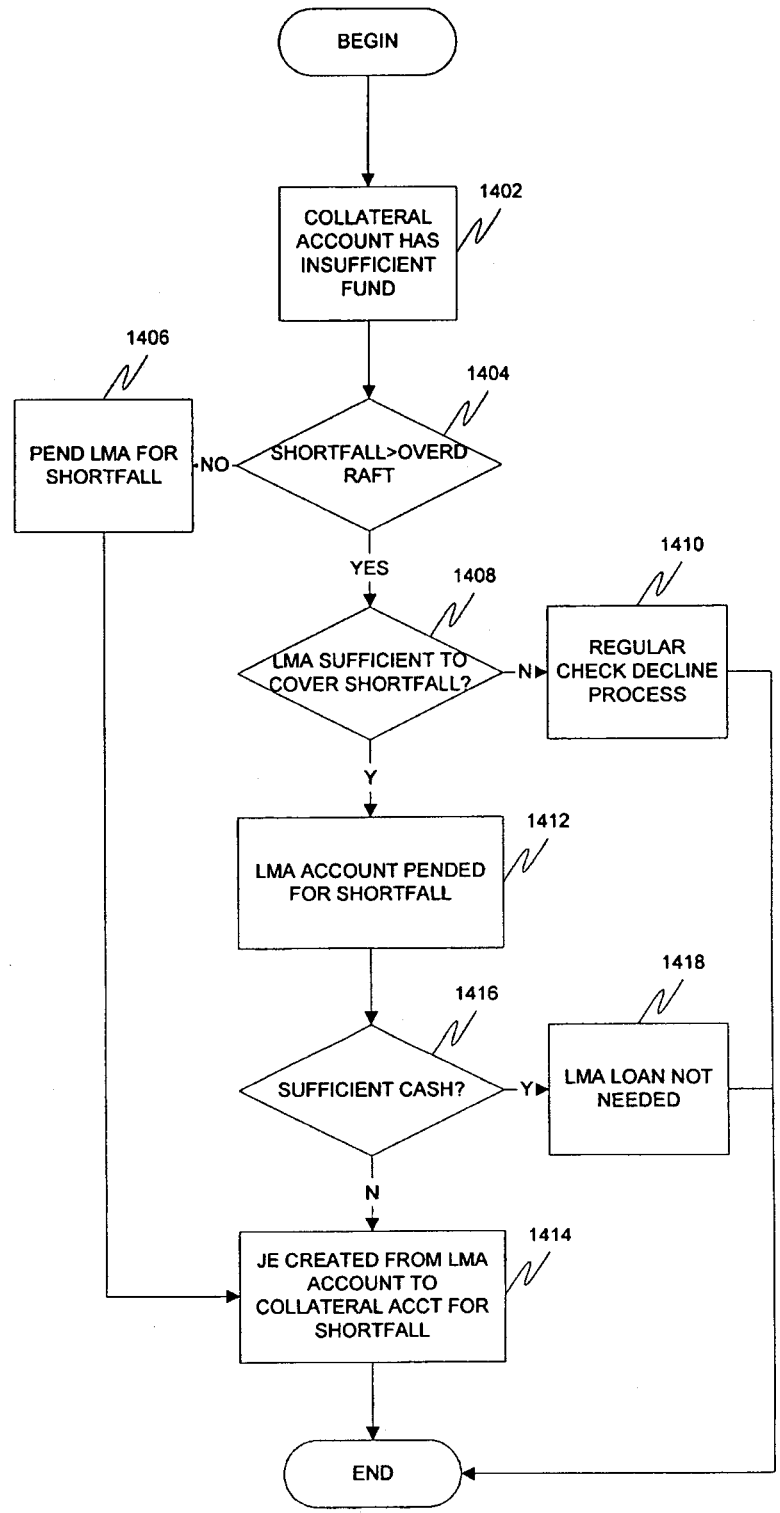
FIG. 14 is a flow diagram schematically illustrating an example of an overdraft process for a collateral account using the loan account in accordance with one embodiment.

On day 16, the client writes an LMA convenience check for $30,000 to a car dealership. On day 17, the client writes a check on the CMA collateral account and the check goes into overdraft. The overdraft process is illustrated in FIG. 14. At 1402, the collateral account with the overdraft feature encounters insufficient funds. If the shortfall is greater than the overdraft threshold at 1404, the system checks whether there are sufficient availability in the LMA to cover the shortfall at 1408. If there isn't, the regular check decline process continues at 1410. If there are sufficient funds are 1408, the LMA account is pended for the amount of the shortfall (the availability on the LMA is reduced by the shortfall amount). If there are sufficient cash from AP/ACH credit settling at 1416, the CMA recognizes that LMA loan is not needed at 1418 and the process ends at 1420. If there is insufficient cash at 1416, a journal entry is created from the LMA account to the collateral account for the amount of the shortfall at 1414. Also, if the shortfall is greater than the overdraft threshold at 1404, instead of creating an overdraft/loan, CMA pends the LMA for the shortfall at 1406.

Figure 15:
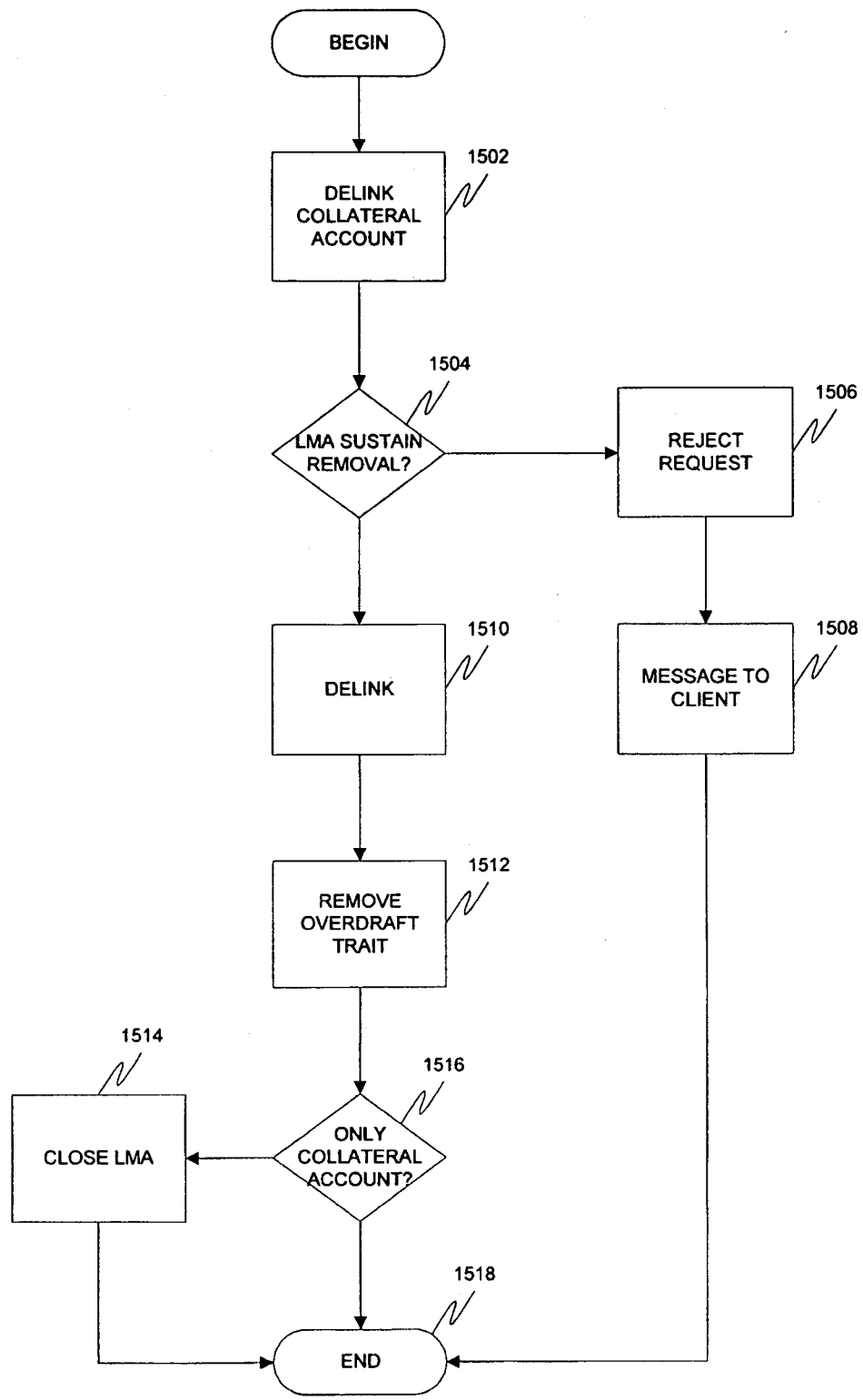
FIG. 15 is a flow diagram schematically illustrating an example of a process for delinking a collateral account in accordance with one embodiment.

On day 20, the client decides to delink a collateral account. FIG. 15 illustrates an example of a delink of a collateral account process at 1502. A determination of whether the LMA can sustain the removal of this account is made at 1504. If it cannot, the request is rejected at 1506. A message stating that the amount needed for approval will be returned to the branch office at 1508. If the LMA can sustain the removal, the account is delinked at 1510 and the overdraft trait is removed at 1512. If this was the only collateral account at 1516, the LMA is closed at 1514 and the process ends at 1518.

Figure 16:
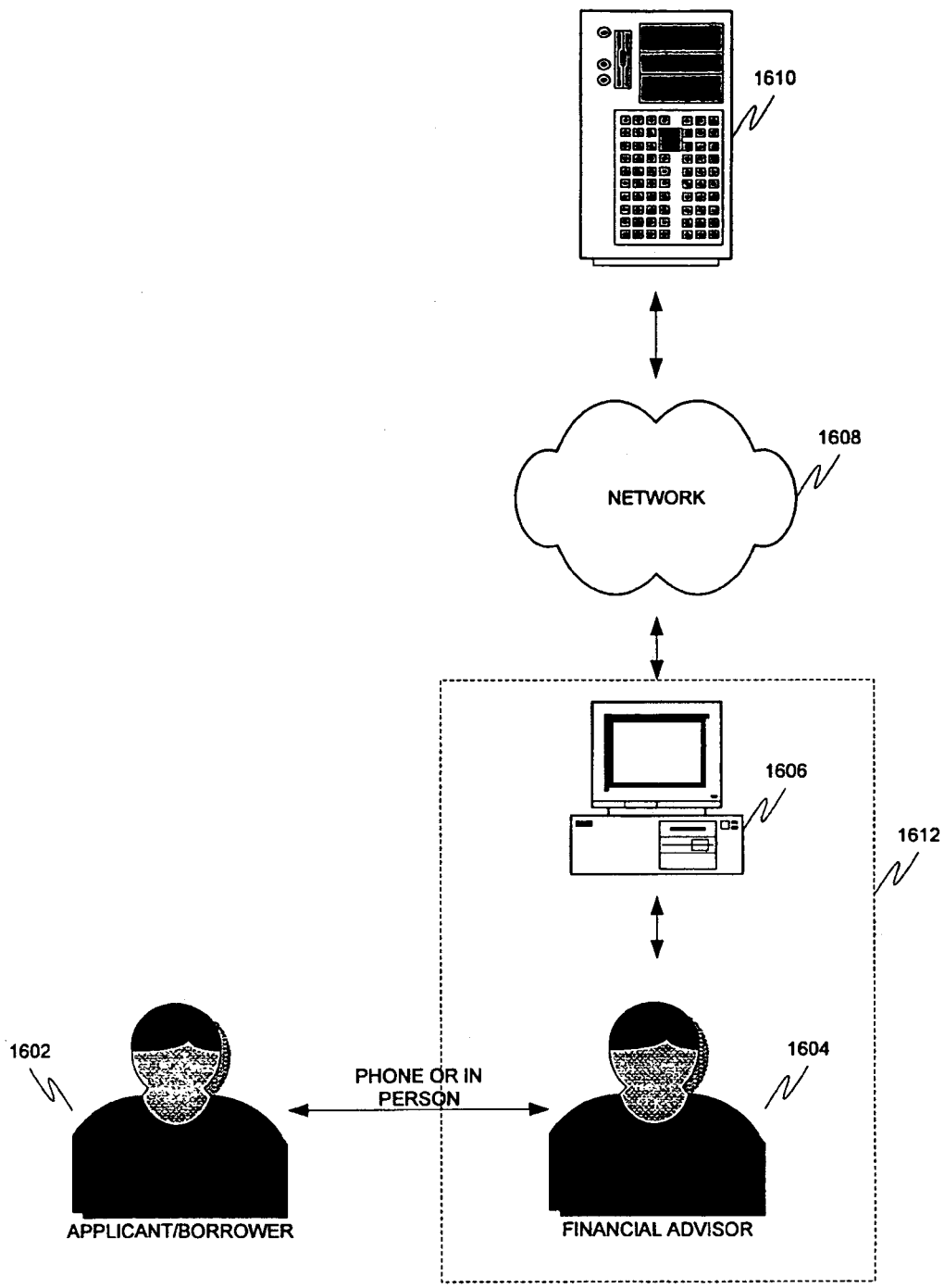
FIG. 16 is a diagram schematically illustrating a system for opening a loan account with a financial institution in accordance with one embodiment.

FIG. 16 illustrates an example of how an applicant applies and manages for the loan account. The applicant 1602 interacts in person or via phone with a Financial Advisor (FA) 1604. In accordance with another embodiment, the applicant 1602 interacts directly with an automated service either via telephone or via a computer. The FA 1604 submits all the requested information from the applicant 1602 on an interface such as a client computer 1606. Those of ordinary skills in the art will recognize that the client computer may consist of a terminal coupled to a computer capable of network communication with other computers. The client computer 1606 may communicate with a server computer 1601 via a network of computers 1608 also known as the Internet. The client computer 1606 and the FA 1604 may be located at a branch 1612 of the financial institution. The server computer 1610 may be located at a central location at the financial institution. In accordance with one embodiment, the client computer 1606 includes the application software enabled to process the application of the loan account. That information is relayed to the central server 1610. In accordance with another embodiment, the client computer 1606 remotely accesses an application from the server computer 1610. The information and the application of the loan account are processed on the server computer 1610.

Figure 17:
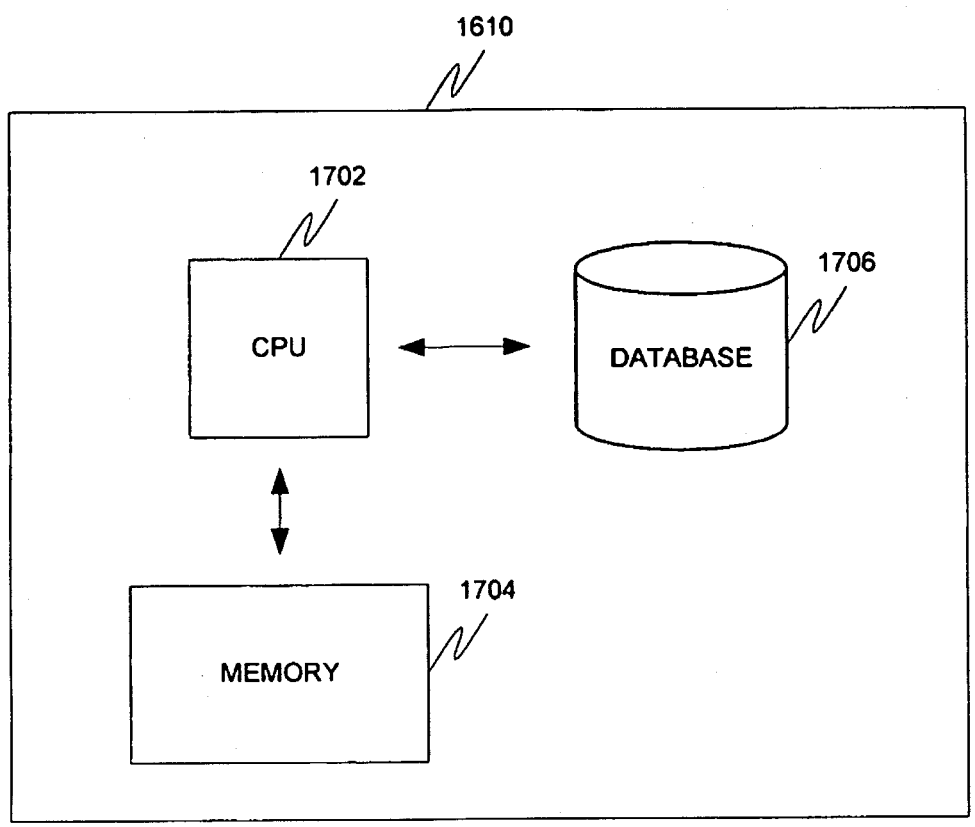
FIG. 17 is a diagram schematically illustrating a system for processing a loan account application at a financial institution in accordance with one embodiment.

FIG. 17 illustrates one embodiment of the server computer 1610. A database 1706 stores the information described above on the applicant. A central processing unit 1702 communicates with the database 1706 and a memory 1704 temporary storing data to be processed. The CPU 1702 computes and analyzes the loan account application. Further the CPU 1702 processes the risk management of the loan account.

Figure 18:
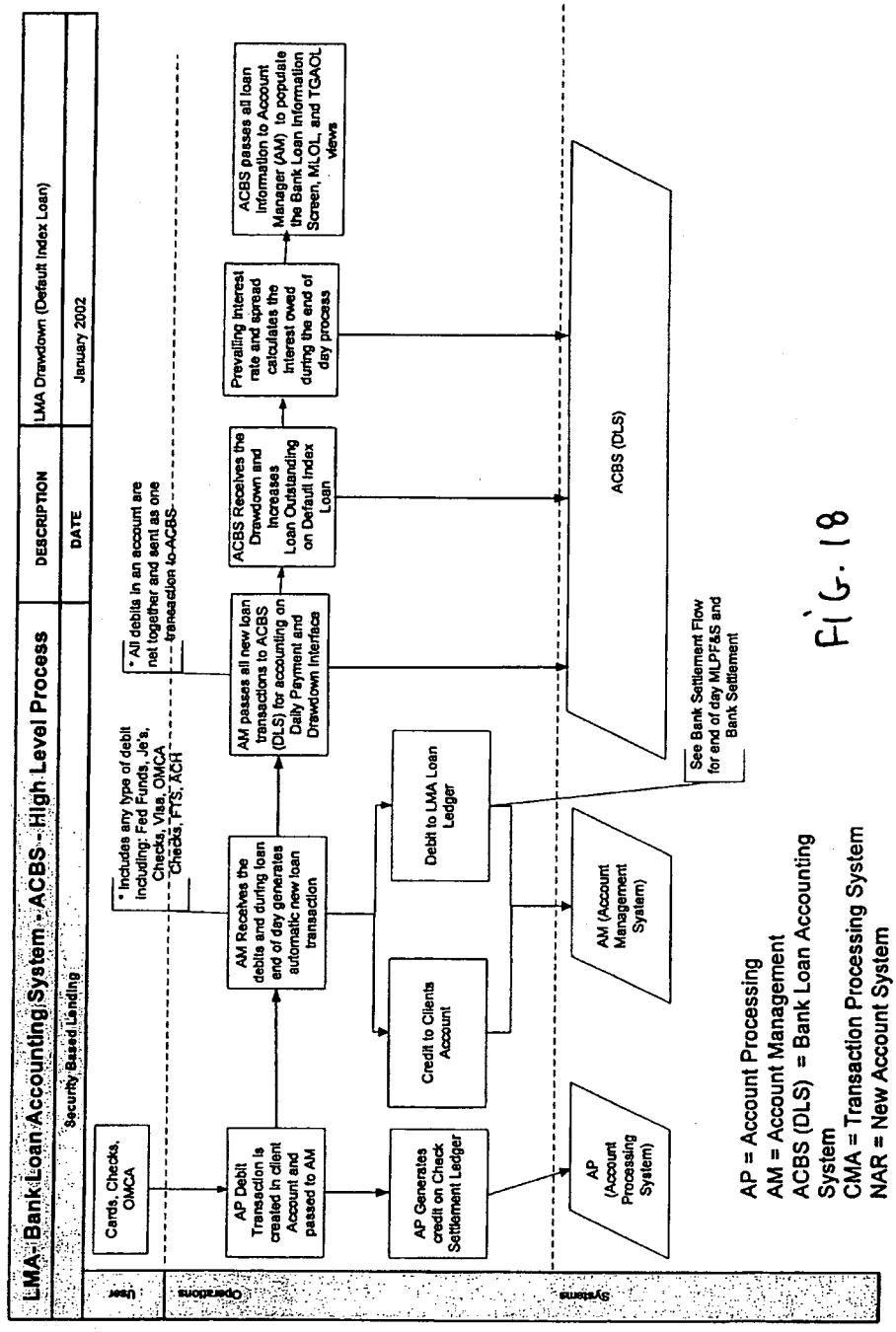
FIG. 18 is a flow diagram illustrating a system for managing and interfacing a loan account with a brokerage collateral account within the same financial institution in accordance with one embodiment.
Figure 19:
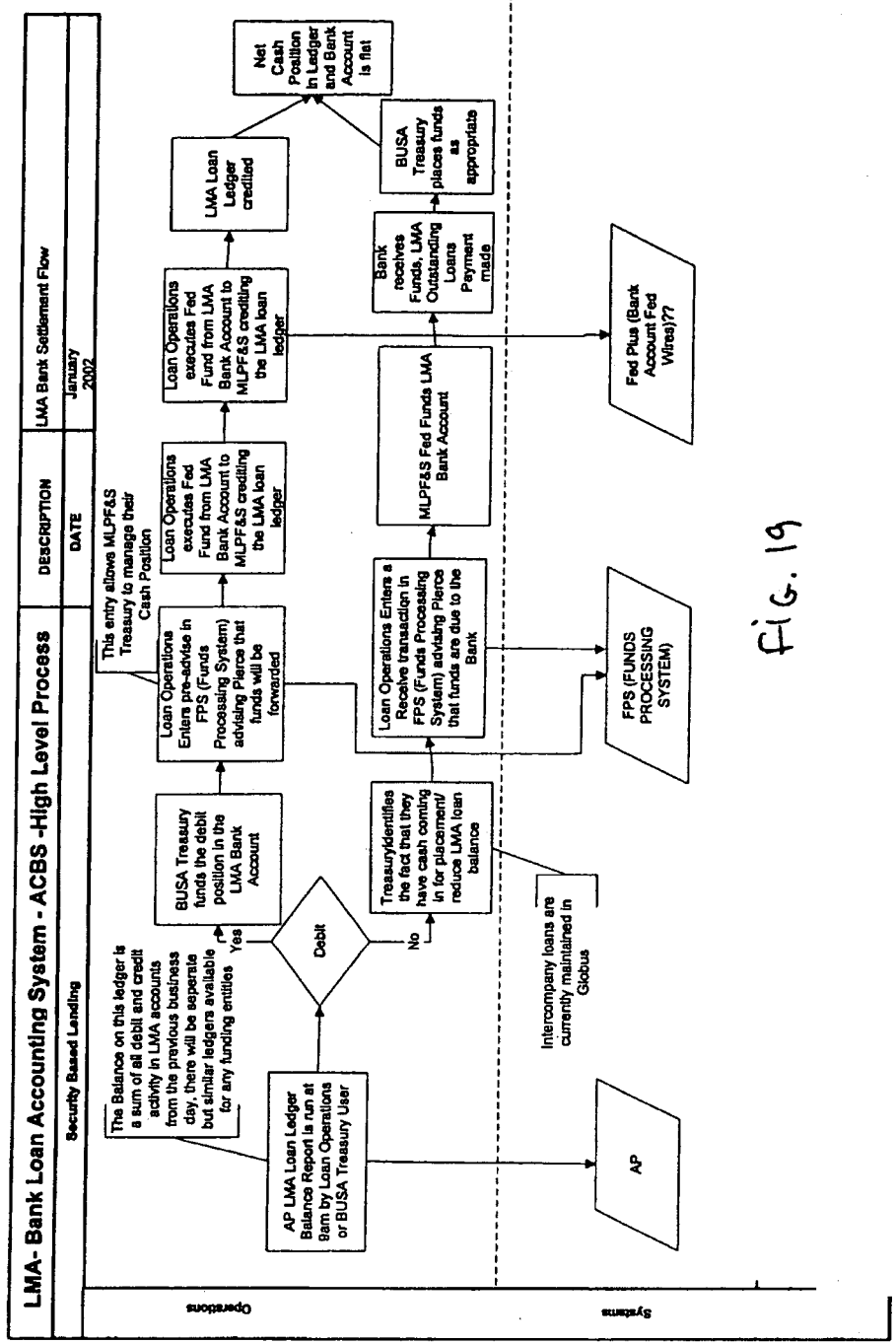
FIG. 19 is a flow diagram illustrating a system for updating and interfacing a loan account with a brokerage collateral account within the same financial institution in accordance with one embodiment.

FIG. 18 is a flow diagram illustrating a system for managing and interfacing a loan account with a brokerage collateral account within the same financial institution. FIG. 19 is a flow diagram illustrating a system for updating and interfacing a loan account with a brokerage collateral account within the same financial institution.

The above described a Loan Management Account that allows the borrower to hold different types of loans in the same structure, using their investment accounts as collateral, with all liabilities consolidated on the same statement. Multiple loans can be now established through a single integrated interface. Clients do not have to reapply each time they need a line of credit with one or more term loans or letters of credit for different financing needs.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for electronically managing financial accounts comprising:

electronically accessing a collateral account held at a financial institution using a computer;

analyzing the collateral account in real time to determine a market value of the collateral account;

establishing a loan account secured by the collateral account with the financial institution using the computer, the loan account comprising a separate bank account from the collateral account;

determining, by the computer, an initial credit limit of the loan account based on the determined market value of the collateral account;

periodically recalculating, by the computer, the market value of the collateral account after the loan account has been established;

adjusting, by the computer, the credit limit of the loan account based on the periodically recalculated market value of the collateral account after the loan account has been established; and interfacing the collateral account with the loan account within the financial institution, such that funds at or under the credit limit are automatically available for withdrawal from the loan account, wherein the collateral account includes a brokerage account at the financial institution and the loan account includes a bank account at the financial institution, and wherein the collateral account includes at least one of an equity, a certificate of deposit, a commercial paper, a real estate investment trust, a corporate instrument, a treasury debt instrument, a municipal debt instrument or a derivative instrument.

2. The method of claim 1 wherein said loan account includes at least one of a revolving line of credit, a term loan, or a letter of credit.

3. The method of claim 2 wherein an interest rate of said line of credit is based on a LIBOR rate.

4. The method of claim 1 further comprising selecting said loan account as an overdraft account for said secured collateral account.

5. The method of claim 1 further comprising accessing said collateral account and said loan account through an integrated portal with a network of computers.

6. The method of claim 1 further comprising accessing said collateral account and said loan account through an integrated portal via telephone.

7. The method of claim 1 further comprising obtaining in real-time a credit report and a credit score of an owner of said collateral account.

8. The method of claim 7 further comprising determining in real-time a credit limit for said loan account based on said analyzing and said credit report and credit score.

9. The method of claim 8 wherein said analyzing includes classifying said collateral account by product type.

10. The method of claim 9 wherein said analyzing includes determining eligible account types from said classifying.

11. The method of claim 10 wherein said analyzing includes determining eligible collateral types from said eligible account types.

12. The method of claim 11 wherein said analyzing includes calculating in real-time said credit limit based on said eligible collateral types and a predetermined set of advance percentage, and requirements percentage.

13. The method of claim 11 wherein said analyzing includes calculating in real-time said credit limit based on a risk category of said eligible collateral types.

14. The method of claim 1 wherein said analyzing includes identifying whether said eligible collateral types is restricted by any regulations.

15. The method of claim 1 further comprising real-time monitoring said secured collateral account.

16. The method of claim 15 wherein said real-time monitoring includes obtaining daily market prices for each security and account types in said secured collateral account and calculating a value of said secured collateral account based on said daily market prices.

17. The method of claim 16 further comprising adjusting said credit limit based on said market value of said collateral account, wherein said collateral account is capable of decreasing in market value.

18. The method of claim 17 further comprising funding said secured collateral account when a total amount borrowed from said loan account exceeds said credit limit.

19. The method of claim 18 wherein said funding includes depositing money into said secured collateral account.

20. The method of claim 18 wherein said funding includes pledging an additional collateral account to said loan account.

21. The method of claim 18 wherein said funding includes liquidating a portion of said secured collateral account when the total amount borrowed from said loan account exceeds said credit limit.

22. The method of claim 1, wherein analyzing the collateral account in real time to determine the market value of the collateral account comprises analyzing the collateral account in response to a request for the loan account.

23. A method for electronically establishing a loan account at a financial institution, the method comprising:
   analyzing a collateral account at the financial institution to determine a market value of the collateral account using a computer, wherein the computer performs the analysis of the collateral account;
   determining an initial credit limit of a loan account secured by the collateral account based on the determined market value of the collateral account by the computer in real time;
   periodically recalculating, by the computer, the market value of the collateral account after the loan account has been established;
   adjusting, by the computer, the credit limit of the loan account based on the periodically recalculated market value of the collateral account after the loan account has been established; and
   interfacing the collateral account with the loan account within the financial institution, such that funds at or under the credit limit are automatically available for withdrawal from the loan account,
   wherein the collateral account includes a brokerage account at the financial institution, and the loan account includes a banking account at the financial institution, wherein the banking account is separate from the collateral account, and wherein the collateral account includes at least one of an equity, a commercial paper, a real estate investment trust, a corporate instrument, a treasury debt instrument, a municipal debt instrument or a derivative instrument.

24. The method of claim 23 wherein said loan account includes at least one of a revolving line of credit, a term loan, or a letter of credit.

25. The method of claim 24 wherein an interest rate of said revolving line of credit is based on a LIBOR rate.

26. The method of claim 23 further comprising selecting the loan account as an overdraft account for said secured collateral account.

27. The method of claim 23 further comprising accessing said collateral account and the loan account through an integrated portal with a network of computers.

28. The method of claim 23 further comprising accessing said collateral account and the loan account through an integrated portal via telephone.

29. The method of claim 23 further comprising obtaining a credit report and a credit score of an owner of said collateral account.

30. The method of claim 29 further comprising determining a credit limit for said loan account based on said analyzing and said credit report and credit score.

31. The method of claim 23 wherein said analyzing includes classifying said collateral account by product type.

32. The method of claim 31 wherein said analyzing includes determining eligible account types from said classifying.

33. The method of claim 32 wherein said analyzing includes determining eligible collateral types from said eligible account types.

34. The method of claim 33 wherein said analyzing includes calculating said credit limit based on said eligible collateral types and a predetermined set of advance percentage, and requirements percentage.

35. The method of claim 33 wherein said analyzing includes calculating said credit limit based on a risk category of said eligible collateral types.

36. The method of claim 23 wherein said analyzing includes identifying whether said eligible collateral types is restricted by any regulations.

37. The method of claim 23, wherein analyzing the collateral account at the financial institution using a computer comprises analyzing the collateral account in response to a request for the loan account.

38. A method for real-time managing a loan account at a financial institution, the method performed in electronically and comprising:
   determining in real-time a market value of a collateral account pledged against a loan account using a computer;
   adjusting in real-time, after the loan account has been established, a credit limit of the loan account based on the determined market value using the computer; and
   interfacing in real-time the collateral account with the loan account within the financial institution using the computer, wherein funds at or under the credit limit are automatically available for withdrawal from the loan account,
   wherein the loan account is a bank account at the financial institution, and the collateral account is a brokerage account at the financial institution, wherein the bank account is separate from the collateral account, and wherein the collateral includes at least one of an equity, a commercial paper, a real estate investment trust, a corporate instrument, a treasury debt instrument, a municipal debt instrument or a derivative instrument.

39. The method of claim 38 further comprising issuing a collateral call when a borrowed amount drawn from the loan account exceeds said credit limit.

40. The method of claim 39 further comprising funding said collateral account upon said issuing of said collateral call.

41. The method of claim 40 wherein said funding includes depositing money into said collateral account.

42. The method of claim 40 wherein said funding includes pledging an additional collateral account to the loan account.

43. The method of claim 40 wherein said funding includes liquidating a portion of said collateral account upon said issuing of said collateral call.

44. The method of claim 38 wherein said determining includes obtaining in real-time daily market prices for each security and account types held in said collateral account and calculating said market value of said collateral account based on said daily market prices.

45. A program storage device readable by a machine, tangibly embodying a program of instructions executable by the machine to perform a method for managing financial accounts, the method comprising:
 electronically accessing a collateral account held at a financial institution; analyzing the collateral account in real time to determine a market value of the collateral account;
 establishing a loan account secured by the collateral account with the financial institution;
 determining an initial credit limit of the loan account based on the determined market value of the collateral account;
 periodically recalculating the market value of the collateral account after the loan account has been established;
 adjusting the credit limit of the loan account based on the periodically recalculated market value of the collateral account after the loan account has been established; and
 interfacing the collateral account with the loan account within the financial institution, such that funds at or under the credit limit are automatically available for withdrawal from the loan account,
 wherein the collateral account includes a brokerage account at the financial institution and the loan account includes a bank account at the financial institution, wherein the bank account is separate from the collateral account, and wherein the collateral account includes at least one of an equity, a commercial paper, a real estate investment trust, a corporate instrument, a treasury debt instrument, a municipal debt instrument or a derivative instrument.

46. A program storage device readable by a machine, tangibly embodying a program of instructions executable by the machine to perform a method for establishing a loan account at a financial institution, the method comprising:
 analyzing a collateral account at the financial institution to determine a market value of the collateral account, wherein the computer performs the analysis of the collateral account;
 determining an initial credit limit of a loan account secured by the collateral account based on the determined market value of the collateral account in real time;
 periodically recalculating, by the computer, the market value of the collateral account after the loan account has been established;
 adjusting, by the computer, the credit limit of the loan account based on the periodically recalculated market value of the collateral account after the loan account has been established; and
 interfacing the collateral account with the loan account within the financial institution, such that funds at or under the credit limit are automatically available for withdrawal from the loan account,
 wherein the collateral account includes a brokerage account at the financial institution, and the loan account includes a banking account at the financial institution, wherein the banking account is separate from the collateral account, and wherein the collateral account includes at least one of an equity, a commercial paper, a real estate investment trust, a corporate instrument, a treasury debt instrument, a municipal debt instrument or a derivative instrument.

47. A program storage device readable by a machine, tangibly embodying a program of instructions executable by the machine to perform a method for managing a loan account at a financial institution, the method comprising:
 determining in real-time a market value of a collateral account pledged against the loan account;
 adjusting in real-time, after the loan account has been established, a credit limit of the loan account based on the determined market value; and
 interfacing in real-time the collateral account with the loan account within the financial institution, wherein funds at or under the credit limit are automatically available for withdrawal from the loan account,
 wherein the loan account is a bank account at the financial institution, and the collateral account is a brokerage account at the financial institution, wherein the bank account is separate form the collateral account, and wherein the collateral account includes at least one of an equity, a commercial paper, a real estate investment trust, a corporate instrument, a treasury debt instrument, a municipal debt instrument or a derivative instrument.

* * * * *

UNITED STATES PATENT AND TRADEMARK OFFICE
CERTIFICATE OF CORRECTION

| | | |
|---|---|---|
| PATENT NO. | : 7,873,568 B1 | Page 1 of 7 |
| APPLICATION NO. | : 11/001577 | |
| DATED | : November 30, 2004 | |
| INVENTOR(S) | : Bill Sappington | |

It is certified that error appears in the above-identified patent and that said Letters Patent is hereby corrected as shown below:

Delete Figs. 8A-8F and replace them with the attached replacement sheets of Figs. 8A-8F.

Signed and Sealed this
Fourteenth Day of February, 2012

David J. Kappos
*Director of the United States Patent and Trademark Office*